(12) United States Patent
Yang et al.

(10) Patent No.: US 8,072,416 B2
(45) Date of Patent: Dec. 6, 2011

(54) INTEGRATED DIGITAL DEVICE AND DISPLAYING METHOD USING THE SAME

(75) Inventors: Hong-seok Yang, Seongnam-si (KR);
Yong-hyun Lee, Suwon-si (KR);
Ji-hyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1033 days.

(21) Appl. No.: 11/488,036

(22) Filed: Jul. 18, 2006

(65) Prior Publication Data

US 2007/0033626 A1    Feb. 8, 2007

Related U.S. Application Data

(60) Provisional application No. 60/701,114, filed on Jul. 21, 2005.

(30) Foreign Application Priority Data

| Aug. 30, 2005 | (KR) | ......................... 10-2005-0080337 |
| Aug. 30, 2005 | (KR) | ......................... 10-2005-0080354 |
| Aug. 30, 2005 | (KR) | ......................... 10-2005-0080357 |
| Aug. 30, 2005 | (KR) | ......................... 10-2005-0080358 |
| Aug. 30, 2005 | (KR) | ......................... 10-2005-0080359 |
| Aug. 30, 2005 | (KR) | ......................... 10-2005-0080361 |

(51) Int. Cl.
*G09G 5/00*      (2006.01)
(52) U.S. Cl. ........................ 345/156; 345/169; 715/841
(58) Field of Classification Search ........... 345/156–173
See application file for complete search history.

(56) References Cited

U.S. PATENT DOCUMENTS

| 6,005,549 | A | 12/1999 | Forest |
| 6,317,141 | B1 | 11/2001 | Pavley et al. |
| 6,952,229 | B1 * | 10/2005 | Takahashi et al. ....... 348/333.02 |
| 7,084,916 | B2 * | 8/2006 | Morimoto et al. ....... 348/333.01 |
| 7,096,431 | B2 * | 8/2006 | Tambata et al. ............... 715/834 |
| 7,337,403 | B2 * | 2/2008 | Pavley et al. .................. 715/747 |
| 7,463,288 | B2 * | 12/2008 | Aoyama .................... 348/231.1 |
| 2002/0060816 | A1 | 5/2002 | Dow et al. |
| 2003/0187654 | A1 * | 10/2003 | Hoshino ....................... 704/270 |
| 2003/0229894 | A1 | 12/2003 | Okada et al. |
| 2004/0140995 | A1 | 7/2004 | Goldthwaite et al. |
| 2005/0030404 | A1 | 2/2005 | Takahashi et al. |
| 2005/0060744 | A1 | 3/2005 | Kim et al. |
| 2005/0207726 | A1 * | 9/2005 | Chen ............................... 386/46 |
| 2006/0119707 | A1 * | 6/2006 | Merrell et al. ........... 348/207.99 |

FOREIGN PATENT DOCUMENTS

CN    1520156    8/2004

(Continued)

*Primary Examiner* — Duc Dinh
(74) *Attorney, Agent, or Firm* — Roylance, Abrams, Berdo & Goodman, L.L.P.

(57) ABSTRACT

An integrated digital device and a displaying method are provided. The integrated digital device includes a display unit displaying a plurality of setup information items. A plurality of input keys positioned in the vicinity of the plurality of setup information items, respectively, are displayed on the display unit. A mode input unit selecting one among a plurality of modes in which different digital device functions are performed and a modifier modifying at least one of the setup information items according to at least one among the mode selected by the mode input unit and an input from at least one of the input keys.

16 Claims, 28 Drawing Sheets

FOREIGN PATENT DOCUMENTS

| | | |
|---|---|---|
| EP | 0903676 | 3/1999 |
| EP | 1408673 | 4/2004 |
| JP | 64-086228 | 3/1989 |
| JP | 2000/298545 | 10/2000 |
| JP | 2001-344251 | 12/2001 |
| JP | 2002-152446 | 5/2002 |
| JP | 2002-175141 | 6/2002 |
| JP | 2002-343067 | 11/2002 |
| JP | 2003-51903 | 2/2003 |
| JP | 2003-068060 | 3/2003 |
| JP | 2004-135271 | 4/2004 |
| KR | 2001-0076508 | 8/2001 |
| KR | 2002-0061808 | 7/2002 |
| KR | 2003-95609 | 12/2003 |
| KR | 2003-0095609 | 12/2003 |
| KR | 2004-0000216 | 1/2004 |
| KR | 2004-41819 | 5/2004 |
| KR | 2004-66222 | 7/2004 |
| KR | 2004-0090068 | 10/2004 |
| KR | 2004-0107813 | 12/2004 |
| KR | 20050028116 | 3/2005 |
| KR | 2005-0044844 | 5/2005 |
| KR | 2005-55674 | 6/2005 |
| KR | 2005-0063221 | 6/2005 |
| KR | 2005-0072844 | 7/2005 |
| KR | 2005-0073825 | 7/2005 |
| WO | WO-98/12868 | 3/1998 |

* cited by examiner

PRESS SECOND INPUT KEY

FIG. 19
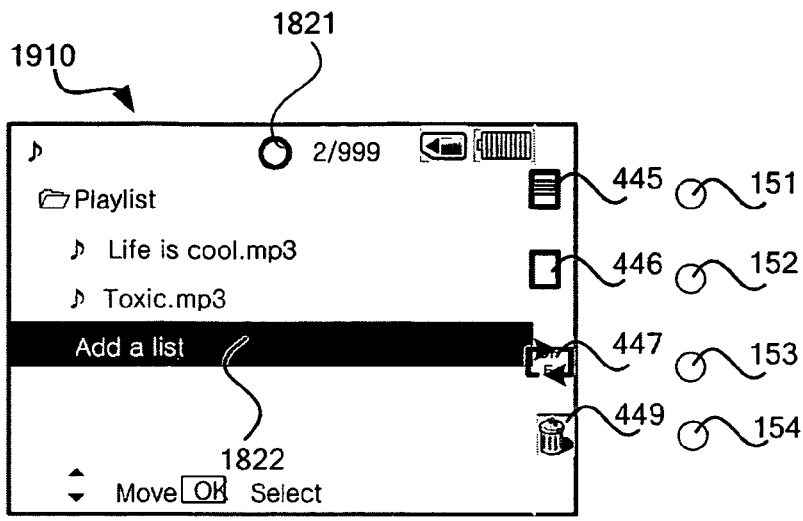
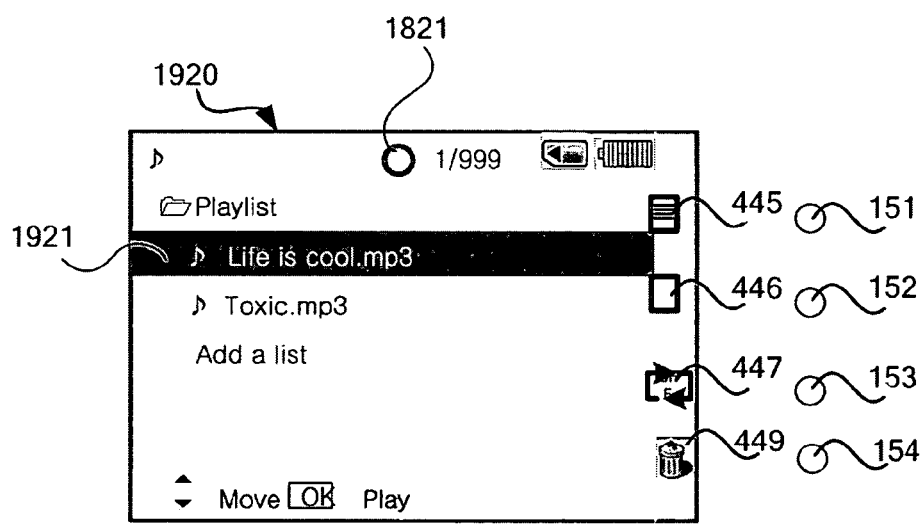
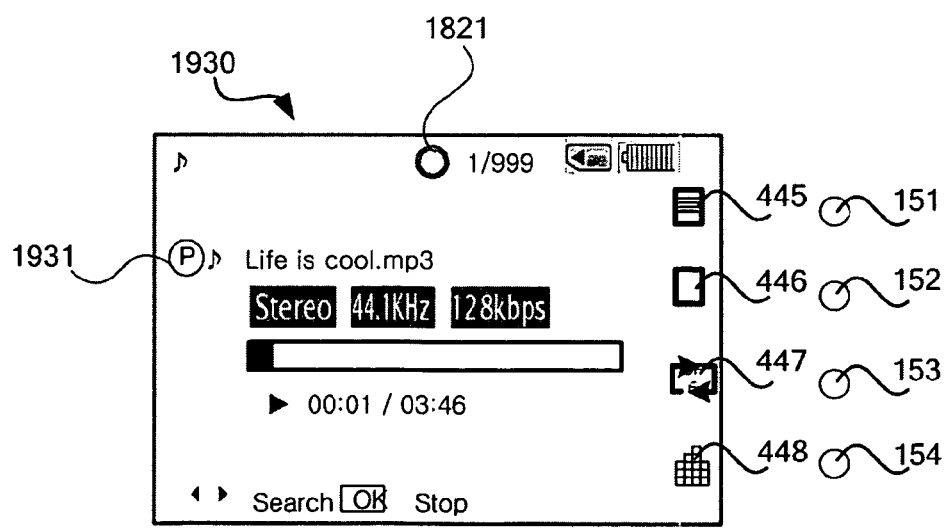

INTEGRATED DIGITAL DEVICE AND DISPLAYING METHOD USING THE SAME

CROSS-REFERENCE TO RELATED APPLICATIONS

This application claims the benefit under 35 U.S.C. §119 (a) of Korean Patent Application Nos. 10-2005-0080337 filed on Aug. 30, 2005, 10-2005-0080354 filed on Aug. 30, 2005, 10-2005-0080357 filed on Aug. 30, 2005, 10-2005-0080358 filed on Aug. 30, 2005, 10-2005-0080359 filed on Aug, 30, 2005, 10-2005-0080361 filed on Aug. 30, 2005 in the Korean Intellectual Property Office, and claims the benefit under 35 U.S.C. §119(e) of U.S. Provisional Patent Application No. 60/701,114 filed on Jul. 21, 2005 in the United States Patent and Trademark Office, the entire disclosures of which are hereby incorporated by reference.

BACKGROUND OF THE INVENTION

1. Field of the Invention

The present invention relates to an integrated digital device functioning as different digital devices in different modes. More particularly, the present invention relates to an integrated digital device functioning as different digital devices such as a digital camera, a digital camcorder, a digital multimedia broadcasting (DMB) receiver, and an MPEG layer 3 (MP3) player in different modes.

2. Description of the Related Art

Recently, a plurality of independently functioning digital devices have been integrated into single devices, which has enabled an integrated digital device comprising a digital camera, a digital camcorder, a DMB receive, and an MP3 player, among others to be combined into one device. To control many functions of different digital devices, a plurality of functions allowing a user to set different types of necessary information should be provided. To allow the user to quickly change setup information, a plurality of input devices such as buttons may be provided. However, input devices which use multiple buttons to input setup information for the functions prevent a user from easily using a digital device. To overcome this problem, a structure in which a menu screen allowing a user to select and execute a preferred process according to a combination of a selection button and a decision button is displayed on a display device such as a liquid crystal display (LCD) is used. However, an operation required to execute the preferred process is a complicated, time-consuming process.

Also, when a selected menu item moves up and down or to the left and right over main menu items in a state in which main menu items are fixed in a main menu area, sub menu items of the selected main menu item also shift up and down or to the left and right. Therefore, the structure of a screen is complicated. In particular, when a user moves the highlight fast over the main menu items for a quick search, sub menu items belonging to a selected main menu item also quickly move. This causes a visual inconvenience to a user.

Moreover, when a user enters an input command using an input. key button on a screen displaying icons indicating a plurality of setup information items and icons and characters indicating state information of the screen in a shooting mode or a playback mode, all of the icons and the characters are removed from the screen and only an object is displayed on the screen. In this state, when the user operates the same input key button on the screen displaying the object, a backlight of the screen is turned off so that even the object is not shown. In this case, since all of the icons serving as hot keys disappear in response to the user's single input command, the user cannot know information necessary for shooting or playback.

In an integrated digital device, a user can search for a preferred multimedia content using thumbnails corresponding to multimedia contents. However, the number of thumbnails that can be displayed on a screen at one time is limited and a search using a conventional method takes a large amount of time when a large number of multimedia contents are stored.

Accordingly, there is a need for an improved system and method to eliminate limitations on the number of thumbnails that can be displayed and to decrease the amount of time required to search when a large number of multimedia contents are stored.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an integrated digital device allowing a plurality of function modes to be set using several input keys and different types of information to be set using at least one input key, thereby allowing many functions to be controlled with a small number of buttons.

According to an exemplary embodiment of the present invention, an integrated digital device for adjusting a state of an MPEG layer 3 (MP3) player mode is provided. Several input keys are used and state information of the MP3 player mode is output to a display according to the change in a state of the MP3 player mode.

An exemplary embodiment of the present invention also provides an integrated digital device for adjusting a state of a digital multimedia broadcasting (DMB) receiver mode using several input keys and outputting state information of the DMB receiver mode to a display according to the change in a state of the DMB receiver mode.

According to another exemplary embodiment of the present invention, a menu display method for efficiently displaying a plurality of function modes and various main and sub menus of a digital device comprising various functions, thereby providing convenient graphical user interface (GUI) for users, and a digital device using the menu display method are provided.

An exemplary embodiment of the present invention also provides an icon display method for allowing a user to select a screen, from which all icons and characters except hot key information indicating essential functions are removed, or a screen, from which all icons and characters are totally removed, using a step-by-step key input command in a digital camera or a digital camcorder, thereby providing convenience for the user, and a digital device using the icon display method.

An exemplary embodiment of the present invention also provides a display device and method in which the number of thumbnails and a search interval change according to a period of time while selection of a multimedia content search button is continued.

These and other objects of exemplary embodiments of the present invention will be described in or be apparent from the following description of the preferred embodiments.

According to an aspect of an exemplary embodiment of the present invention, an integrated digital device including a display unit, a plurality of input keys, mode input unit, and a modifier are provided. The display unit displays a plurality of setup information items and the plurality of input keys are positioned in the vicinity of the plurality of setup information items, respectively, displayed on the display unit. The mode input unit selects one among a plurality of modes in which different digital device functions are performed and the modifier modifies at least one of the setup information items according to at least one among the mode selected by the mode input unit and an input from at least one of the input keys.

According to another aspect of an exemplary embodiment of the present invention, an integrated digital device including a display unit, a plurality of input keys, a mode input unit, and a modifier are provided. The display unit displays a plurality of setup information items and at least one among information indicating that an MPEG layer 3 (MP3) file is set to an erase protection state and information indicating that the MP3 file is listed on a user playlist. The plurality of input keys are positioned in the vicinity of the plurality of setup information items, respectively, and displayed on the display unit. The mode input unit selects an MP3 player mode among a plurality of modes in which different digital device functions are performed and a modifier modifies at least one of the information displayed on the display unit and the setup information items according to at least one among the MP3 player mode selected by the mode input unit and an input from at least one of the input keys.

According to still another aspect of an exemplary embodiment of the present invention, an integrated digital device is provided including a mode input unit selecting a digital multimedia broadcasting (DMB) receiver mode among a plurality of modes in which different digital device functions are performed, a receiver searching for and receiving a DMB signal, a display unit displaying the received DMB signal and information on a state of the DMB receiver mode, an input key unit receiving information for changing the state of the DMB receiver mode from a user.

According to yet another aspect of an exemplary embodiment of the present invention, a digital device is provided comprising a screen on which a menu is displayed in a hierarchical structure. The digital device includes a mode selector which selects one among a plurality of modes in which different functions are performed, a menu item selector which selects a menu item in a first menu area among a plurality of menu areas displayed in the mode selected by the mode selector, and a display unit which displays sub menu items of the menu item, which is selected in the first menu area by the menu item selector, on a second menu area set at a predetermined position of the screen as a sub area of the first menu area.

According to a further aspect of an exemplary embodiment of the present invention, a method of displaying a menu in a hierarchical structure is provided. A mode is selected from a plurality of modes in which different functions are performed, a menu item in a first menu area is selected from a plurality of menu areas displayed in the selected mode, and sub menu items of the menu item are displayed, which is selected in the first menu area, on a second menu area set at a predetermined position of a screen as a sub area of the first menu area.

According to yet a further aspect of an exemplary embodiment of the present invention, a method of displaying an icon is provided. Icons which indicate a plurality of setup information items are displayed. Icons and characters which indicate screen state information on a screen in a shooting mode or a play mode of a digital device are also displayed. All of the icons and the characters are deleted, except the icons which indicate the plurality of setup information items from the screen in response to a first input command input by a user.

Also, all of the remaining icons which indicate the plurality of setup information items from the screen in response to a second input command input by the user are deleted.

According to still yet another aspect of an exemplary embodiment of the present invention, a digital device including a display unit, an input unit, and a modifier. The display unit displays icons which indicate a plurality of setup information items and icons and characters which indicate screen state information on a screen in a shooting mode or a play mode of a digital device. The input unit receives a first input command to delete all of the icons and the characters except the icons which indicate the plurality of setup information items from the screen and a second input command to delete all of the remaining icons which indicate the plurality of setup information items from the screen. The modifier deletes all of the icons and the characters except the icons which indicate the plurality of setup information items from the screen in response to the first input command received by the input unit and deletes all of the remaining icons which indicate the plurality of setup information items from the screen in response to the second input command received by the input unit.

According to still yet a further aspect of an exemplary embodiment of the present invention, a device for displaying multimedia contents is provided. The device includes a button signal input unit to receive a button signal, a determiner to detect a duration while the button signal is input, a content extractor to extract multimedia contents in different numbers according to the duration, and a display unit to display thumbnails corresponding to the extracted multimedia contents.

According to an alternative aspect of an exemplary embodiment of the present invention, a method of displaying multimedia contents is provided. A button signal is received, a duration is detected while the button signal is input, multimedia contents are extracted in different numbers according to the duration, and thumbnails corresponding to the extracted multimedia contents are displayed.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will be more apparent from the following description taken in conjunction with the accompanying drawings in which:

FIG. 19 illustrates a procedure of playing an MP3 file on a user playlist in the MP3 player mode of the integrated digital device according to an exemplary embodiment of the present invention;

Throughout the drawings, the same drawing reference numerals will be understood to refer to the same elements, features, and structures

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modification of the embodiments described herein can be made without departing from the scope and spirit of the invention. Also, descriptions of well-known functions and constructions are omitted for clarity and conciseness.

Figure 1:
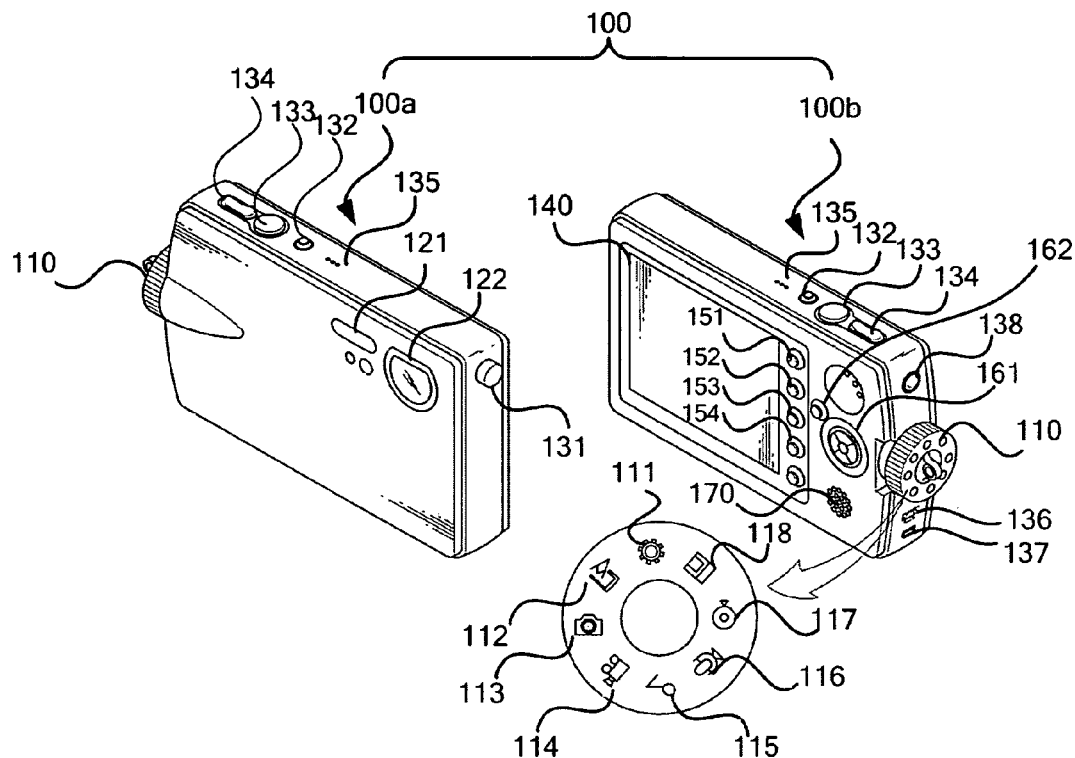
FIG. 1 shows front and rear perspective views of an integrated digital device according to an exemplary embodiment of the present invention.

FIG. 1 shows front and rear perspective views 100a and 100b of an integrated digital device 100 according to an exemplary embodiment of the present invention.

The integrated digital device 100 is a multifunction device into which a digital camera, a digital camcorder, a digital multimedia broadcasting (DMB) receiver, an MPEG layer 3 (MP3) player, an audio recorder, a universal serial bus (USB) storage, and a personal computer (PC) camera are combined. The appearance of the integrated digital device 100 will be described with reference to the front perspective view 100a and the rear perspective view 100b. To change an operating mode of the integrated digital device 100, a user operates a mode dial 110 positioned, at a side of the integrated digital device 100. The user can select one among a digital camera mode 113, a digital camcorder mode 114, a DMV receiver mode 112, an MP3 player mode 115, an audio recorder mode 116, a USB storage mode 118, a PC camera mode 117, and a setting mode 111 by operating the mode dial 110.

Input keys 151, 152, 153, and 154 which allow a user to input different types of setup information according to a mode selected by the operation of the mode dial 110 are disposed near a liquid crystal display (LCD) 140 and particularly near portions 141 through 144 (FIG. 2) where icons indicating setup information that can be set using the input keys 151 through 154, respectively, are displayed on the LCD 140.

The user can move a pointer using a four-direction key 161 to select a menu item or a preferred content on a thumbnail screen.

The integrated digital device 100 also includes a USB port 136 connected to a PC to function as a USB storage, a direct current (DC) power connector 137, and a headphone connector 138. The rear side of the integrated digital device 100 includes a menu button 162 displaying a menu screen for menu setting; the four-direction key 161 moving the pointer up, down, to the left, and to the right; and a speaker 170 outputting sound. The top of the integrated digital device 100 includes a power button 131, a shutter button 132 used to take a digital photograph or video, a zoom button 133, and a microphone 134 for recording audio. A sliding antenna for DMB reception may be provided on another side of the integrated digital device 100. The integrated digital device 100 also includes a camera lens 122 and a flash 121 on its front side.

The integrated digital device 100 is made to function as one among a plurality of digital devices by the mode dial 110. For example, when the mode dial 110 is set to the digital camera mode 113, the input keys 151 through 154 are set to be suitable for setting of digital camera functions. When the mode dial 110 is set to the DMB receiver mode 112, the input keys 151 through 154 are set to be suitable for setting of the functions of a DMB receiver. The functions of the input keys 151 through 154 which are set differently according to a mode of the integrated digital device 100 and display of the functions will be described with reference to FIG. 4 later.

Figure 2:
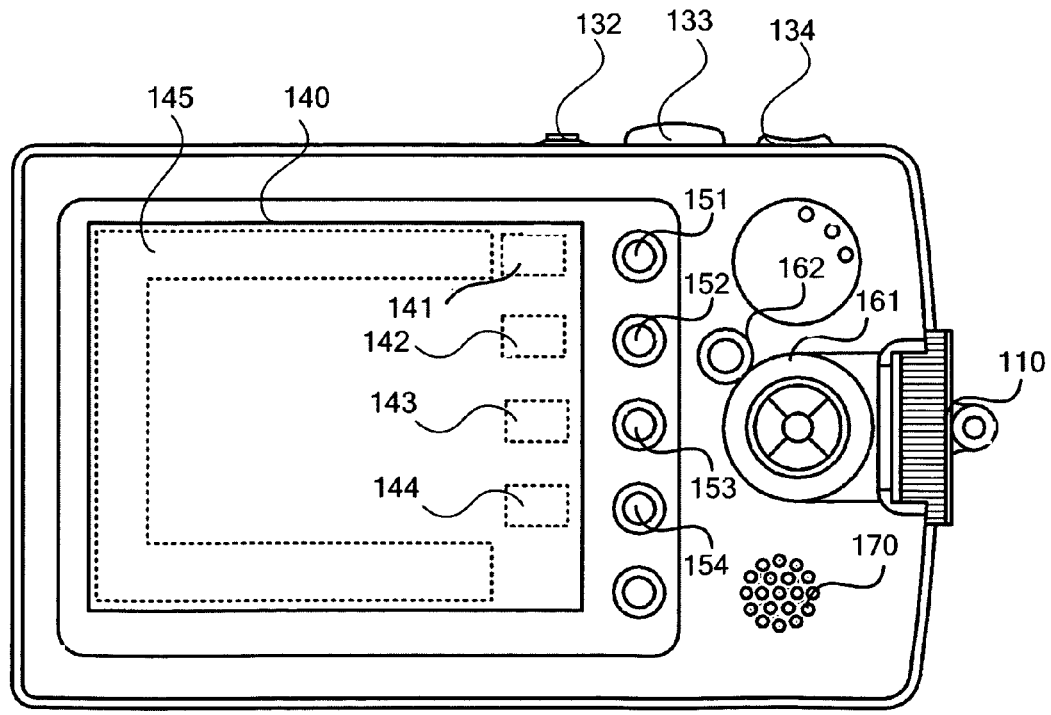
FIG. 2 is a detailed rear view of the integrated digital device shown in FIG. 1.

FIG. 2 is a detailed rear view of the integrated digital device 100 shown in FIG. 1.

A display 140 such as an LCD is positioned on the rear side of the integrated digital device 100. The display includes the portions 141 through 144 where icons indicating information set by the input keys 151 through 154, respectively, are displayed and a portion 145 where various icons indicating state information of a digital device; and the input keys 151 through 154 positioned in the vicinity of the portions 141 through 144. The portions 141 through 144 where icons indicating information set by the input keys 151 through 154, respectively, are positioned in the vicinity of the input keys 151 through 154 so that a user can easily recognize what kind of information each of the input keys 151 through 154 is used to set. Also, symbolic icons which allow the user to intuitively recognize a type of information set by each of the input keys 151 through 154 may be used so that the user can easily use the integrated digital device 100.

Figure 3:
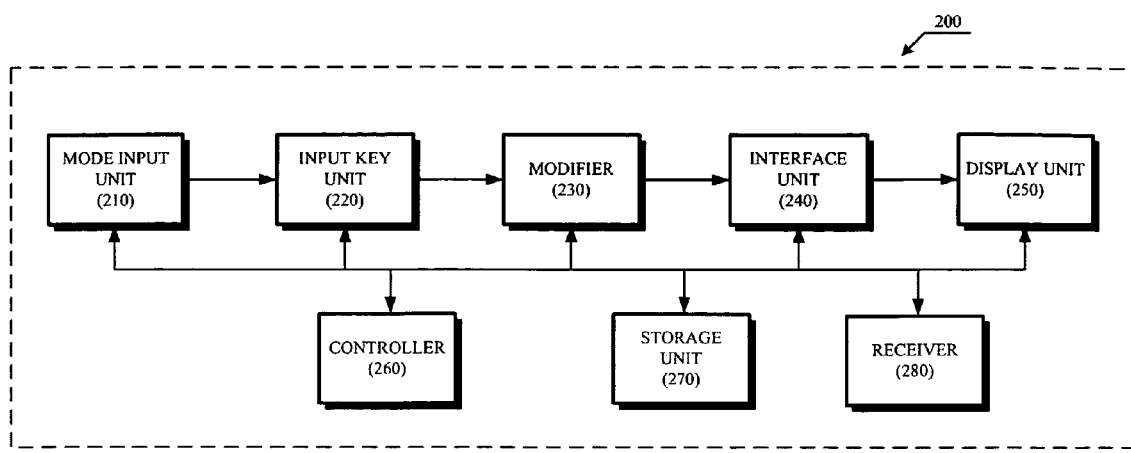
FIG. 3 is a block diagram of an integrated digital device according to an exemplary embodiment of the present invention.

FIG. 3 is a block diagram of an integrated digital device 200 according to an exemplary embodiment of the present invention.

The integrated digital device 200 includes a mode input unit 210, an input key unit 220, a modifier 230, an interface unit 240, a display unit 250, a controller 260, a storage unit 270, and a receiver 280.

The mode input unit 210 selects one digital device function among a plurality of digital device functions combined into the integrated digital device 200 and may be implemented by the mode dial 110 (FIGS. 1 and 2). A user can set the integrated digital device 200 to a preferred digital device function using the mode input unit 210. When the MP3 player mode 115 is selected by the mode input unit 210, the display unit 250 outputs a screen displaying information on a previously played MP3 file. This operation will be described in detail with reference to FIG. 16 later. When the DMB receiver mode 112 is selected by the mode input unit 210, the receiver 280 searches for receivable DMB channels and receives DMB signals.

The input key unit 220 is used to input setup information regarding main functions or operating information with respect to each mode and to select a sub mode in each mode, for example, a shooting mode or a playback mode in the digital camera mode 113. The input key unit 220 may be implemented by buttons. The user can make a list of stored MP3 files displayed, activate a playlist mode in which a playlist of favorite MP3 files is generated or changed, select a type of repeated playback, and select a type of equalizer using the input key unit 220 in the MP3 player mode 115. The user may also select a display type for a channel list, register a favorite channel, and shift to the favorite channel to be played using the input key unit 220 in the DMB receiver mode 112.

The modifier 230 modifies setup information that can be controlled using the input key unit 220 according to an input of the mode input unit 210 or an input of at least one input key unit 220. The modifier 230 also modifies setup information or operation corresponding to an input key included in the input key unit 220 according to an input of another input key included in the input key unit 220, and deactivates an input key that is not necessary in a current digital device mode. Also, the modifier 230 changes a state of the MP3 player mode 115 according to information transmitted from the input key unit 220 to change a state of an MP3 file or to change a user playlist in the MP3 player mode 115. The modifier 230 also changes a state of the DMB receiver mode 112 according to information transmitted from the input key unit 220 to change the state of the DMB receiver mode 112 in the DMB receiver mode 112.

The interface unit 240 generates icons indicating setup information corresponding to input keys, which will be displayed on the display unit 250 according to setup information or operations controlled using the input key unit 220 modified by the modifier 230. The interface unit 240 also generates icons indicating attributes of an MP3 file, icons indicating the state of the MP3 player mode 115, and icons indicating the state of the DMB receiver mode 112, and transmits the icons to the display unit 250.

The display unit 250 displays the icons indicating the setup information or operations controlled by the input key unit 220 and various icons indicating state information of the integrated digital device 200.

The controller 260 controls the integrated digital device 200 according to setup information that has been set by the mode input unit 210 and the key input unit 220. The storage unit 270 stores the setup information and contents such as images, moving pictures, and music to be displayed on the display unit 250.

In FIG. 3, various components include, but are not limited to, software or hardware components, such as Field Programmable Gate Arrays (FPGAs) or Application Specific Integrated Circuits (ASICs), which perform certain tasks. The components may advantageously be configured to reside on the addressable storage media and configured to execute on one or more processors. The functionality provided for in the components and modules may be combined into fewer components and modules or further separated into additional components and modules.

Figure 4:
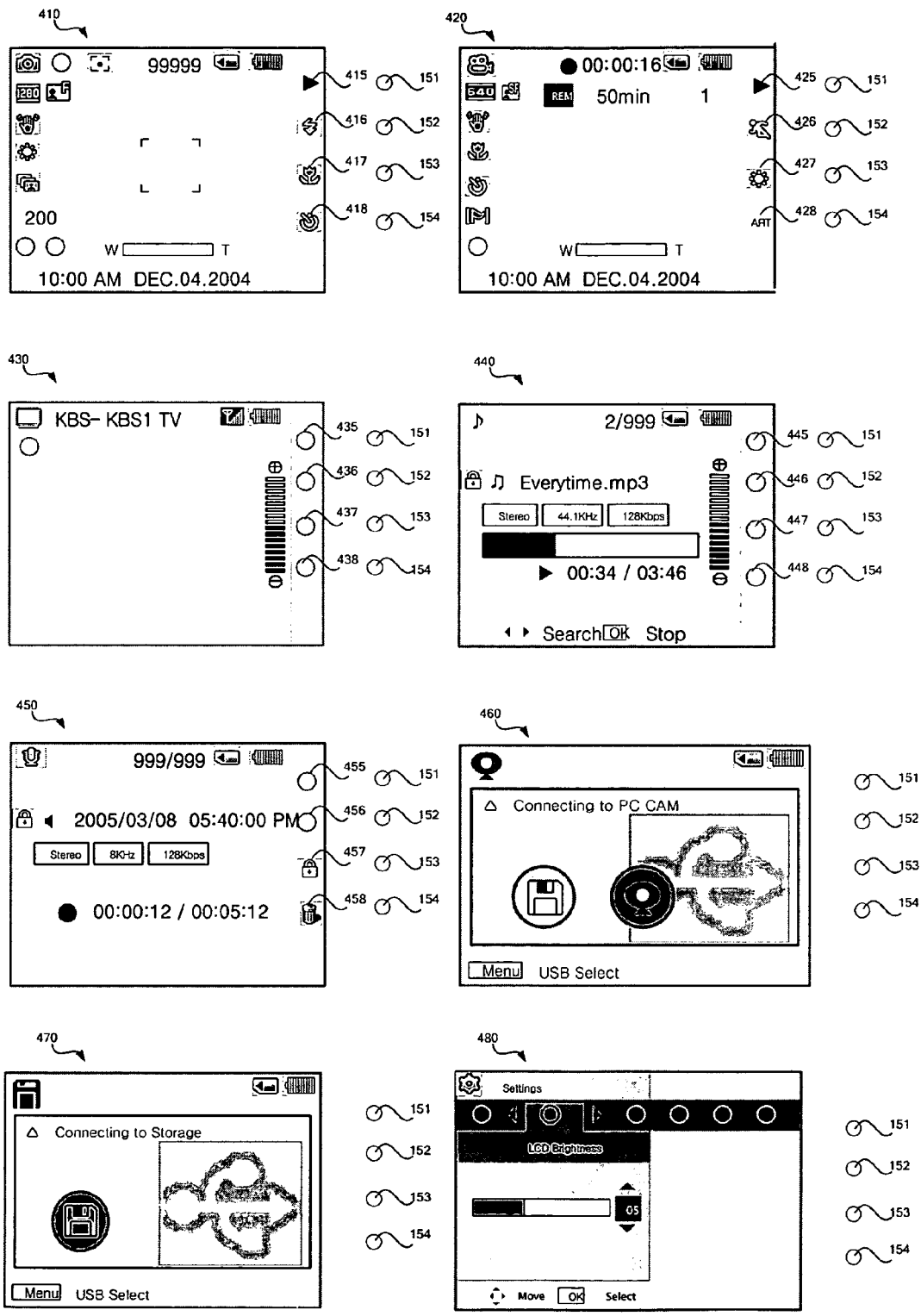
FIG. 4 illustrates the changes in setup information or operation that can be controlled by an input key in various function modes of an integrated digital device according to an exemplary embodiment of the present invention.

FIG. 4 illustrates the changes in setup information or operation that may be controlled by an input key in various function modes of the integrated digital device 100, according to an exemplary embodiment of the present invention.

When the mode dial 110 of the integrated digital device 100 is set to the digital camera mode 113, the display 140 changes into a screen 410. Various icons indicating state information of the integrated digital device 100 operating as a digital camera are displayed. Also, icons 415, 416, 417, and 418 indicating main functions of the digital camera, which can be controlled using the input keys 151 through 154, respectively, are displayed near the input keys 151 through 154 on the display 140.

In an exemplary embodiment of the present invention, when the integrated digital device 100 is set to the digital camera mode 113, a shooting mode is set as displayed on the screen 410. When the first input key 151 is pressed in the shooting mode, the shooting mode is converted into a playback mode of a digital camera. When the first input key 151 is pressed in the playback mode, the playback mode is converted into the shooting mode. The icon 415 corresponding to the first input key 151 indicates whether the integrated digital device 100 is in the shooting mode or the playback mode in the digital camera mode 113.

The second input key 152 sets and cancels a flash mode. The third input key 153 sets and cancels a close-up shooting mode. The fourth input key 154 turns on or turns off a self-timer. Here, the icons 415 through 418 displayed on an LCD symbolically indicate information and operations controlled by the input keys 151 through 154, respectively.

When the mode dial 110 of the integrated digital device 100 is set to the digital camcorder mode 114, the display 140 changes into a screen 420. In the digital camcorder mode 114, the first input key 151 sets a playback mode or a shooting mode of a digital camcorder. The second input key 152 sets automatic exposure according to a program. The third input key 153 sets white balance. The fourth input key 154 selects one effect from various digital effects which change the color tone of a recorded video. Preferably, icons 425 through 428 displayed on an LCD symbolically indicate information and operations controlled by the input keys 151 through 154, respectively.

When the mode dial 110 of the integrated digital device 100 is set to the DMB receiver mode 112, the display 140 changes into a screen 430. In the DMB receiver mode 112, the first input key 151 sets one among various modes in which a channel list is displayed. The second input key 152 registers or selects a first favorite channel. The third input key 153 registers or selects a second favorite channel. The fourth input key 154 registers or selects a third favorite channel. Here, icons 435 through 438 displayed on an LCD symbolically indicate information and operations controlled by the input keys 151 through 154, respectively.

When the mode dial 110 of the integrated digital device 100 is set to the MP3 player mode 115, the display 140 changes into a screen 440. The first input key 151 selects a display showing a playback state of a single music title or a display showing a list of stored music titles. The second input key 152 selects whether to show a playlist made by a user. The third input key 153 selects one among a plurality of repeated playback modes. The fourth input key 154 selects one among a plurality of equalizers. Preferably, icons 445 through 448 displayed on an LCD symbolically indicate information and operations controlled by the input keys 151 through 154, respectively. Also, when the user presses the second input key 152 and the playlist made by the user is displayed, the fourth input key 154 is modified to execute a function of deleting an item from the playlist.

When the mode dial 110 of the integrated digital device 100 is set to the audio recorder mode 116, the display 140 changes into a screen 450. The first input key 151 displays a list of recorded audio files. The second input key 152 selects one among a plurality of repeated playback modes. The third input key 153 sets or cancels a file erase protection. The fourth input key 154 deletes a file. Here, icons 455 through 458 displayed on an LCD symbolically indicate information and operations controlled by the input keys 151 through 154, respectively.

When the mode dial 110 of the integrated digital device 100 is set to the PC camera mode 117, a message instructing a user to connect a USB cable appears on the display 140. When the USB cable is connected, the display 140 changes into a screen 460. In the PC camera mode 117, the integrated digital device 100 can be used as a web camera when it is connected to a PC through the USB cable. Since the input keys 151 through 154 are not necessary in the PC camera mode 117, they can be deactivated by removing corresponding icons from the screen 460. This operation is also applied to the storage mode 118 and the setting mode 111.

When the mode dial 110 of the integrated digital device 100 is set to the storage mode 118, a message instructing a user to connect a USB cable appears on the display 140. When the USB cable is connected, the display 140 changes into a screen 470. In the storage mode 118, the integrated digital device 100 can be used as a high-capacity storage medium.

When the mode dial 110 of the integrated digital device 100 is set to the setting mode 111, the display 140 changes into a screen 480. In the setting mode 111, various kinds of environmental information can be set for a digital device. On the screen 480, the brightness of an LCD is adjusted in the setting mode 111.

The functions of the input keys 151 through 154 in each mode of the integrated digital device 100 will be described in detail with reference to FIGS. 5 through 10.

Figure 5:
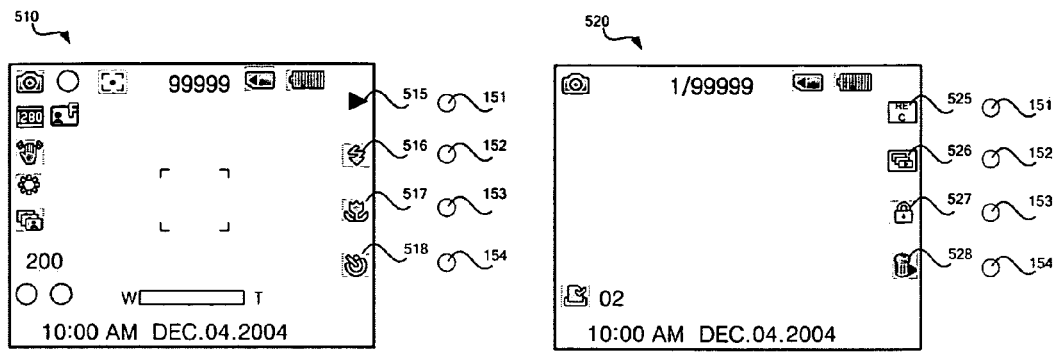
FIG. 5 illustrates functions of input keys and a screen display in a digital camera mode of an integrated digital device according to an exemplary embodiment of the present invention.

FIG. 5 illustrates the functions of the input keys 151 through 154 and screen display in the digital camera mode 113 of the integrated digital device 100, according to an exemplary embodiment of the present invention.

When the integrated digital device 100 is set to the digital camera mode 113 by the operation of the mode dial 110, the integrated digital device 100 enters the shooting mode as shown on a screen 510 and main functions required for shooting are allocated to the input keys 151 through 154. As described above with reference to FIG. 4, the first input key 151 makes a transition between the shooting mode and the playback mode. The second input key 152 sets a flash to one of various light emission states such as "automatic" and "red-eye reduction." The third input key 153 sets or cancels close-up shooting. The fourth input key 154 sets a state of a self-timer.

When a user presses the first input key 151, the shooting mode on the screen 510 is changed into the playback mode on a screen 520 and main functions of the playback mode are newly allocated to the second through fourth input keys 152 through 154. In detail, the second input key 152 sets or cancels a slide show. The third input key 153 sets or cancels an image erase protection. The fourth key 154 deletes an image. The image erase protection is a function for preventing an image from being deleted accidentally. When transition from the shooting mode to the playback mode is made in the digital camera mode 113, icons 515 through 518 which correspond to the input keys 151 through 154 are also converted to icons 525 through 528 suitable to the playback mode.

As described above, in the integrated digital device 100, functions allocated to the input keys 151 through 154 vary with functional modes. In addition, the operation of at least one input key may bring the functions allocated to the other input keys to be modified in one functional mode.

Figure 6:
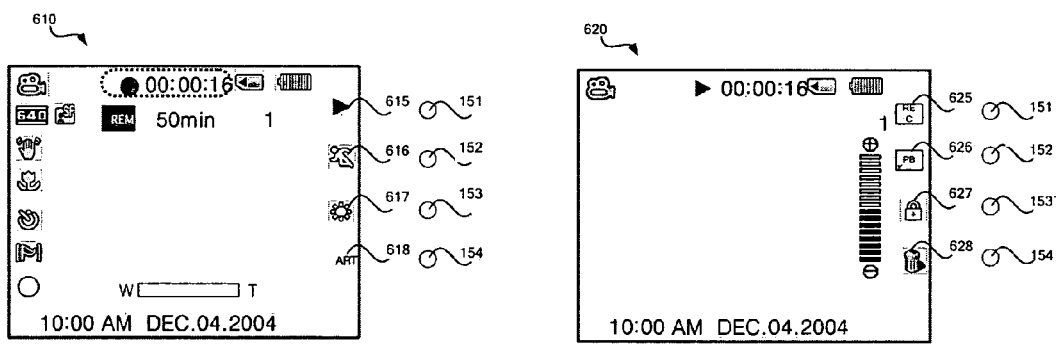
FIG. 6 illustrates functions of input keys and a screen display in a digital camcorder mode of the integrated digital device according to an exemplary embodiment of the present invention.

FIG. 6 illustrates the functions of the input keys 151 through 154 and screen display in the digital camcorder mode 114 of the integrated digital device 100, according to an exemplary embodiment of the present invention.

When the integrated digital device 100 is set to the digital camcorder mode 114 by the operation of the mode dial 110, the integrated digital device 100 enters the shooting mode as shown on a screen 610 and main functions required for video shooting are allocated to the input keys 151 through 154. As described above with reference to FIG. 4, the first input key 151 makes transition between the shooting mode and, the playback mode. The second input key 152 selects one of various automatic exposure modes according to programs such as "automatic", "sports", "spotlight", and "sand/snow". The third input key 153 selects one of various white balance modes such as "automatic", "daylight", "cloudy", and "tungsten". The fourth input key 154 selects one of various digital effects applied to the color tone of an image.

When a user presses the first input key 151, the shooting mode on the screen 610 is changed into the playback mode on a screen 620 and main functions of the playback mode are newly allocated to the second through fourth input keys 152 through 154. In the playback mode shown on the screen 620, the second input key 152 sets a playback option for a store video. The third input key 153 sets or cancels an image erase protection. The fourth key 154 deletes an image.

The playback option selected by the second input key 152 may be an option of playing a single video file or an option of playing all video starting from a position where the last playback was stopped.

When the first input key 151 is pressed in the playback mode on the screen 620, the shooting mode returns to the screen 610. When transition from the shooting mode to the playback mode is made in the digital camcorder mode 114, icons 615 through 618 which correspond to the input keys 151 through 154 are also converted to icons 625 through 628 which are suitable to the playback mode.

Figure 7:
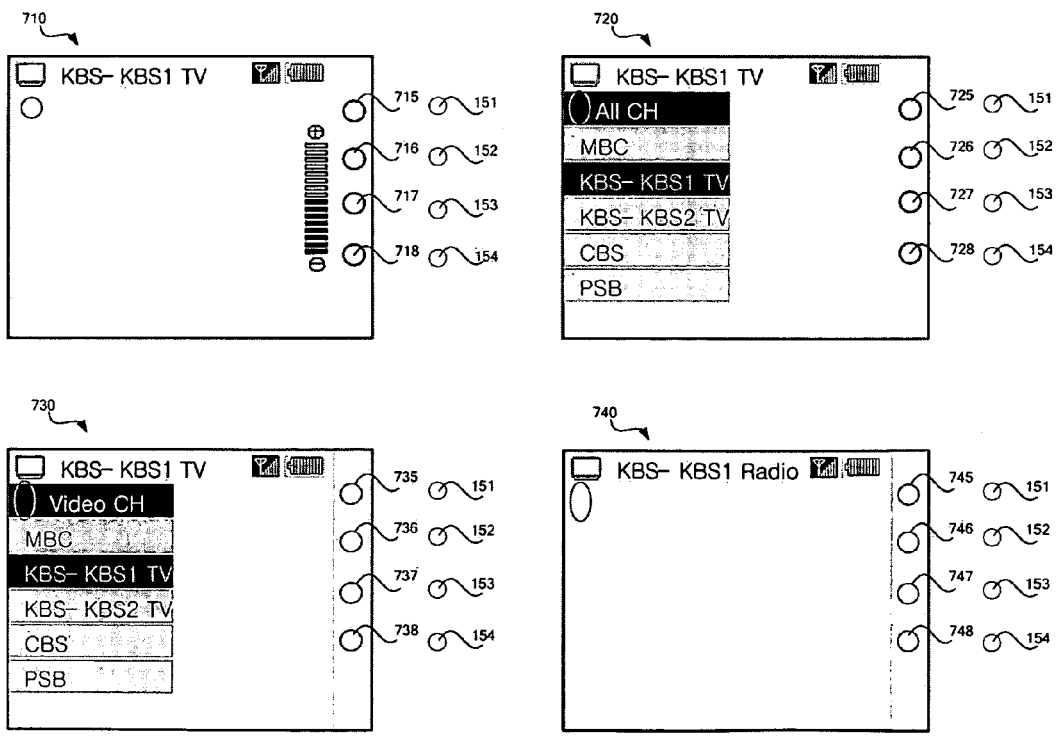
FIG. 7 illustrates functions of input keys and a screen display in a digital multimedia broadcasting (DMB) receiver mode of the integrated digital device according to an exemplary embodiment of the present invention.

FIG. 7 illustrates the functions of the input keys 151 through 154 and screen display in the DMB receiver mode 112 of the integrated digital device 100, according to an exemplary embodiment of the present invention.

When the integrated digital device 100 is set to the DMB receiver mode 112 by the operation of the mode dial 110, the integrated digital device 100 enters a basic play mode as shown on a screen 710 and main functions required to play a broadcast are allocated to the input keys 151 through 154. As described above with reference to FIG. 4, the first input key 151 selects one among channel list options such as "delete channel list", "full channel list", "video channel list", and "audio channel list". In the basic play mode on the screen 710, the second, third and fourth input keys 152, 153, and 154 register or select first, second and third favorite channels, respectively. The functions allocated to the first through fourth input keys 151 through 154 are the same in all play modes respectively shown on screens 710, 720, 730, and 740. However, favorite channels registered in the second through fourth input keys 152 through 154 may be the same or different between all of the play modes shown on the screens 710 through 740.

A user can remove a channel list as shown on the screen 710, display a full channel list as shown on the screen 720, display only a video channel list as shown on the screen 730, or display only an audio channel list as shown on the screen 740 by pressing the first input key 151. The types of channel list displays may be rotationally changed one by one when the first input key 151 is pressed once.

A favorite channel can be registered by continuously pressing down one of the second through fourth input keys 152 through 154 while a broadcast is received. Meanwhile, when one of the second through fourth input keys 152 through 154 is quickly pressed, a current channel is changed to a favorite channel that has been registered in the pressed input key.

Figure 8:
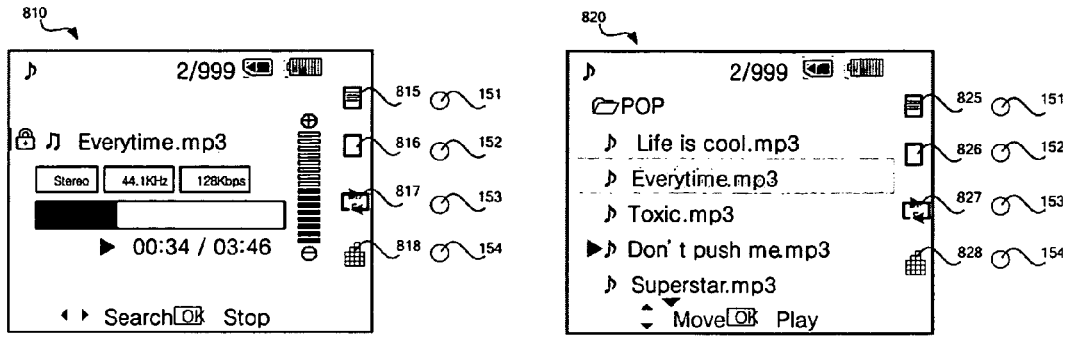
FIG. 8 illustrates functions of input keys and a screen display in an MPEG layer 3 (MP3) player mode of the integrated digital device according to an exemplary embodiment of the present invention.

FIG. 8 illustrates the functions of the input keys 151 through 154 and screen display in the MP3 player mode 115 of the integrated digital device 100, according to an exemplary embodiment of the present invention.

When the integrated digital device 100 is set to the MP3 player mode 115 by the operation of the mode dial 110, the integrated digital device 100 enters a playback mode as shown on a screen 810 and main functions required to play a music file are allocated to the input keys 151 through 154. As described above with reference to FIG. 4, the first input key 151 selects an option for displaying a list of playable music contents in the playback mode. The second input key 152 selects a user-made playlist of music contents. The third input key 153 sets a repeated playback mode. The fourth input key 154 sets an equalizer. When a user presses the first input key 151 in the basic playback mode shown on the screen 810, a list of music contents that can be played is displayed on a screen 820. Here, the functions allocated to the first through fourth input keys 151 through 154 correspond to those in the basic playback mode shown on the screen 810.

Figure 9:
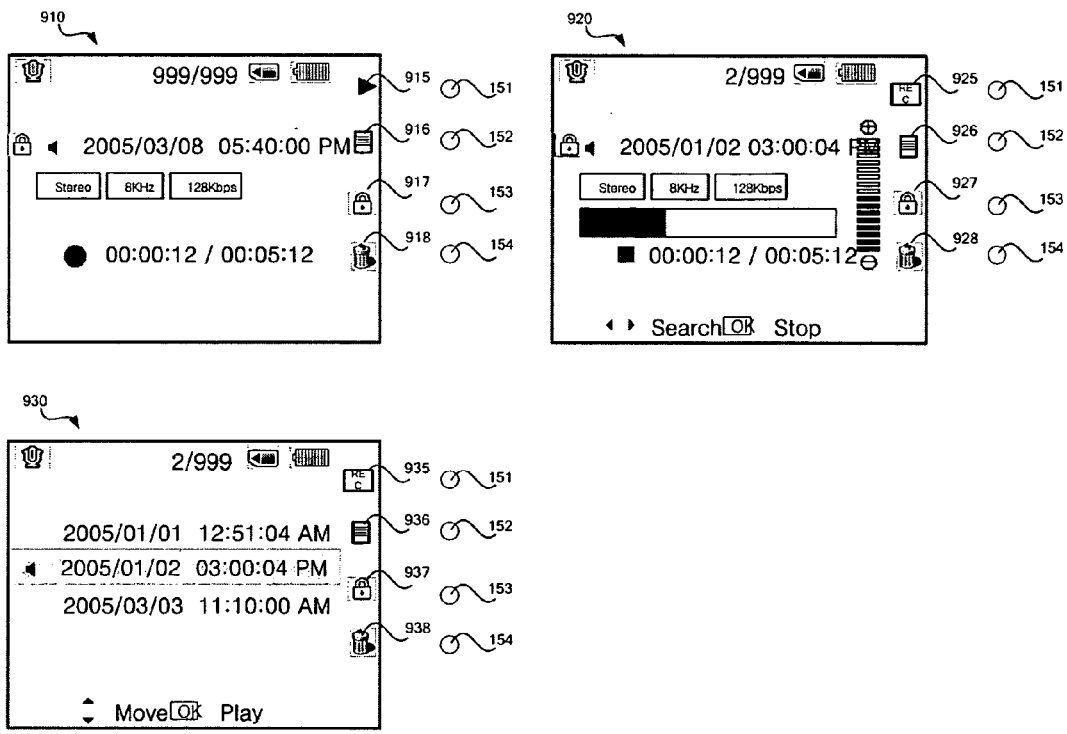
FIG. 9 illustrates functions of input keys and a screen display in an audio recorder mode of the integrated digital device according to an exemplary embodiment of the present invention.

FIG. 9 illustrates the functions of the input keys 151 through 154 and screen display in the audio recorder mode 116 of the integrated digital device 100, according to an exemplary embodiment of the present invention.

When the integrated digital device 100 is set to the audio recorder mode 116 by the operation of the mode dial 110, the integrated digital device 100 enters an audio recording mode as shown on a screen 910 and main functions required for audio recording are allocated to the input keys 151 through 154. In the audio recording mode, the first input key 151 makes a transition between the audio recording mode and a playback mode in which recorded audio is played. The second input key 152 selects an option for displaying a list of playable audio contents. The third input key 153 sets or cancels an erase protection. The fourth input key 154 sets an equalizer.

When the shutter button 133 is pressed in the audio recording mode shown on the screen 910, audio recording starts. Once the shutter button 133 is pressed again, the audio recording stops.

When the first input key 151 is pressed in the audio recording mode shown on the screen 910, the audio recording mode is converted to the playback mode shown on a screen 920, in which a single audio content is played. Here, the second input key 152 is pressed, a list of stored audio contents is displayed on a screen 930. When the first input key 151 is pressed in the playback mode in which a single audio content is played with the screen 920 or a mode in which the list of the stored audio contents is displayed while an audio content selected from the list is played with the screen 930, the integrated digital device 100 returns to the audio recording mode as shown on the screen 910.

Figure 10:
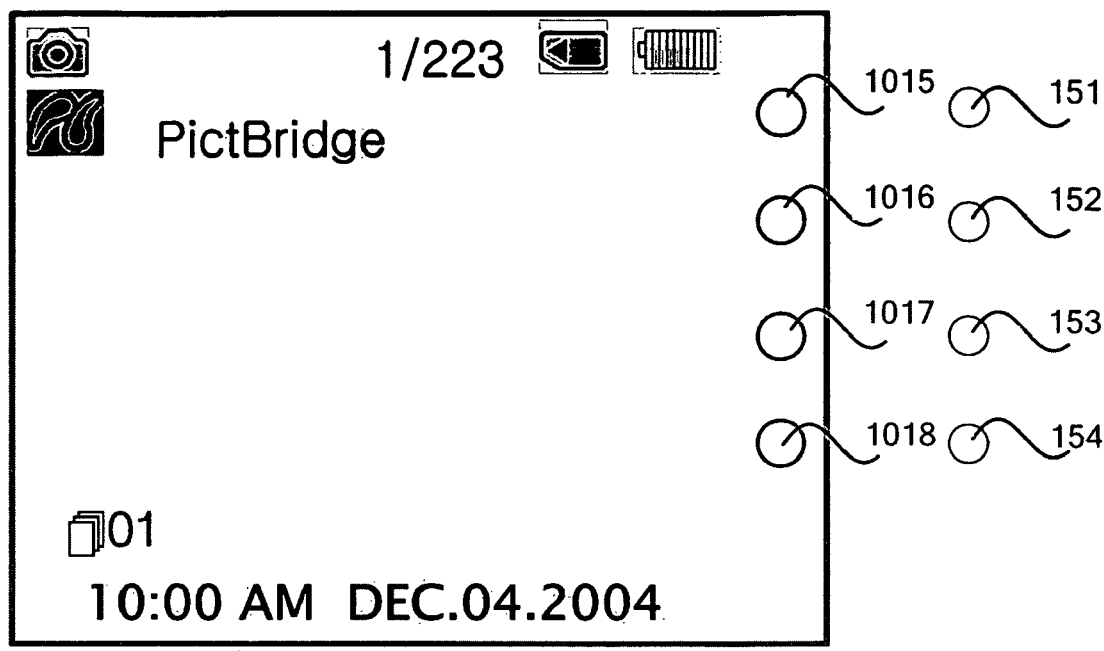
FIG. 10 illustrates functions of input keys and a screen display when a photograph is printed in the digital camera mode of the integrated digital device according to an exemplary embodiment of the present invention.

FIG. 10 illustrates the functions of the input keys 151 through 154 and screen display when a photograph is printed in the digital camera mode 113 of the integrated digital device 100, according to an exemplary embodiment of the present invention.

When an image is printed in the digital camera mode 113, the integrated digital device 100 provides a function of setting the number of copies for each image. The first input key 151 sends an image to an external printer. The second input key 152 sets whether to print a date and time when an image is printed. The third input key 153 increases the number of copies. The fourth input key 154 decreases the number of copies.

Figure 11:
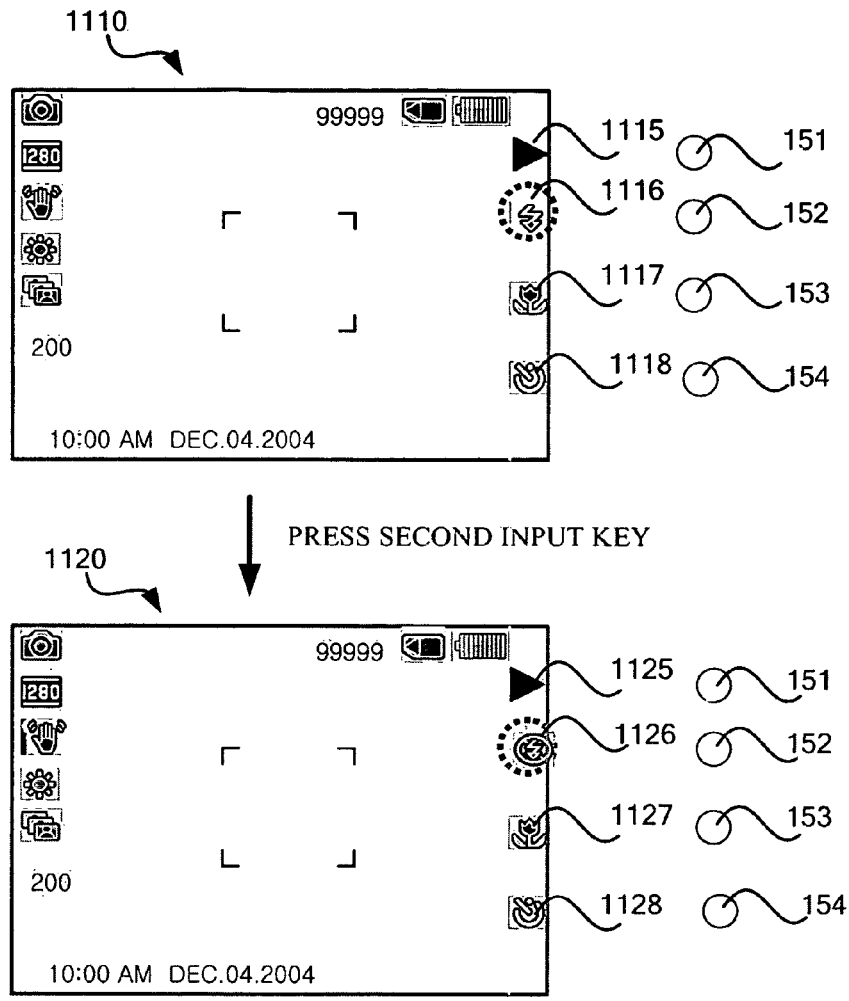
FIG. 11 illustrates the change in setup information according to the operation of an input key in the integrated digital device according to an exemplary embodiment of the present invention.

FIG. 11 illustrates the change in setup information according to the operation of an input key in an integrated digital device according to an exemplary embodiment of the present invention.

When an image is shot in the digital camera mode 113, an icon 1116 corresponding to the second input key 152 on a screen 1110 indicates that a flash function has been activated. Here, a flash mode can be changed by pressing the second input key 152. An icon 1126 corresponding to the second input key 152 on a screen 1120 indicates that the flash function has been deactivated. As described above, in the integrated digital device, according to an exemplary embodiment of the present invention, a user can easily change setup information for the operation of a digital device just through the simple manipulation of an input key.

Figure 12:
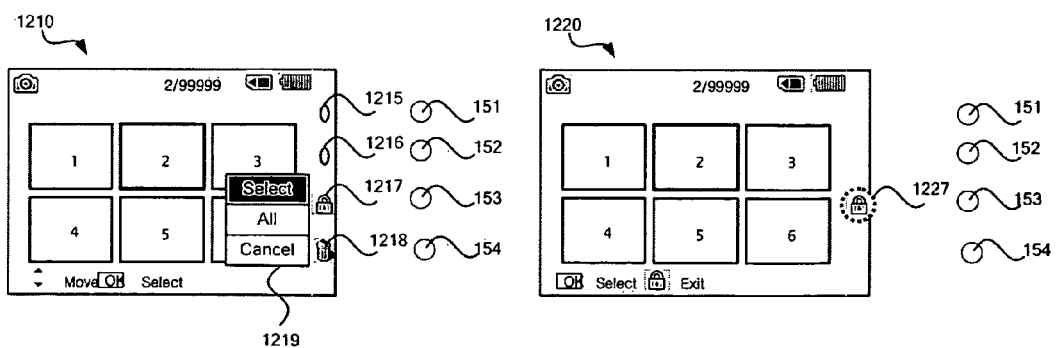
FIG. 12 illustrates a state in which unnecessary input keys are deactivated according to an operating mode of the integrated digital device according to an exemplary embodiment of the present invention.

FIG. 12 illustrates a state in which unnecessary input keys are deactivated according to an operating mode of an integrated digital device according to an exemplary embodiment of the present invention.

FIG. 12 illustrates a procedure of setting an erase protection for an image among a plurality of images displayed on a thumbnail screen using an input key. When a user presses the third input key 153 on a screen 1210, a sub menu 1219 is popped up and the user can select a preferred menu item using the four-direction key 161 (FIGS. 1 and 2). To set an erase protection state for an image, a "Select" item is selected. When the "Select" item is selected, an icon 1227 corresponding to the third input key 153 blinks to indicate that a mode allowing the user to select an image to be set to the erase protection state has been entered on a screen 1220. Here, since the other input keys 151, 152, and 154 are not necessary, their corresponding icons 1215, 1216, and 1218 are removed from the screen 1220 to indicate that the input keys 151, 152, and 154 have been deactivated.

When an image is selected on the thumbnail screen and deleted, icons corresponding to input keys other than an input key performing deletion may be removed from the screen to indicate that the other input keys are deactivated.

If there is no stored music file in the MP3 player mode 115, all icons corresponding to the input keys 151 through 154 are removed to indicate that all of the input keys 151 through 154 have been deactivated.

Figure 13:
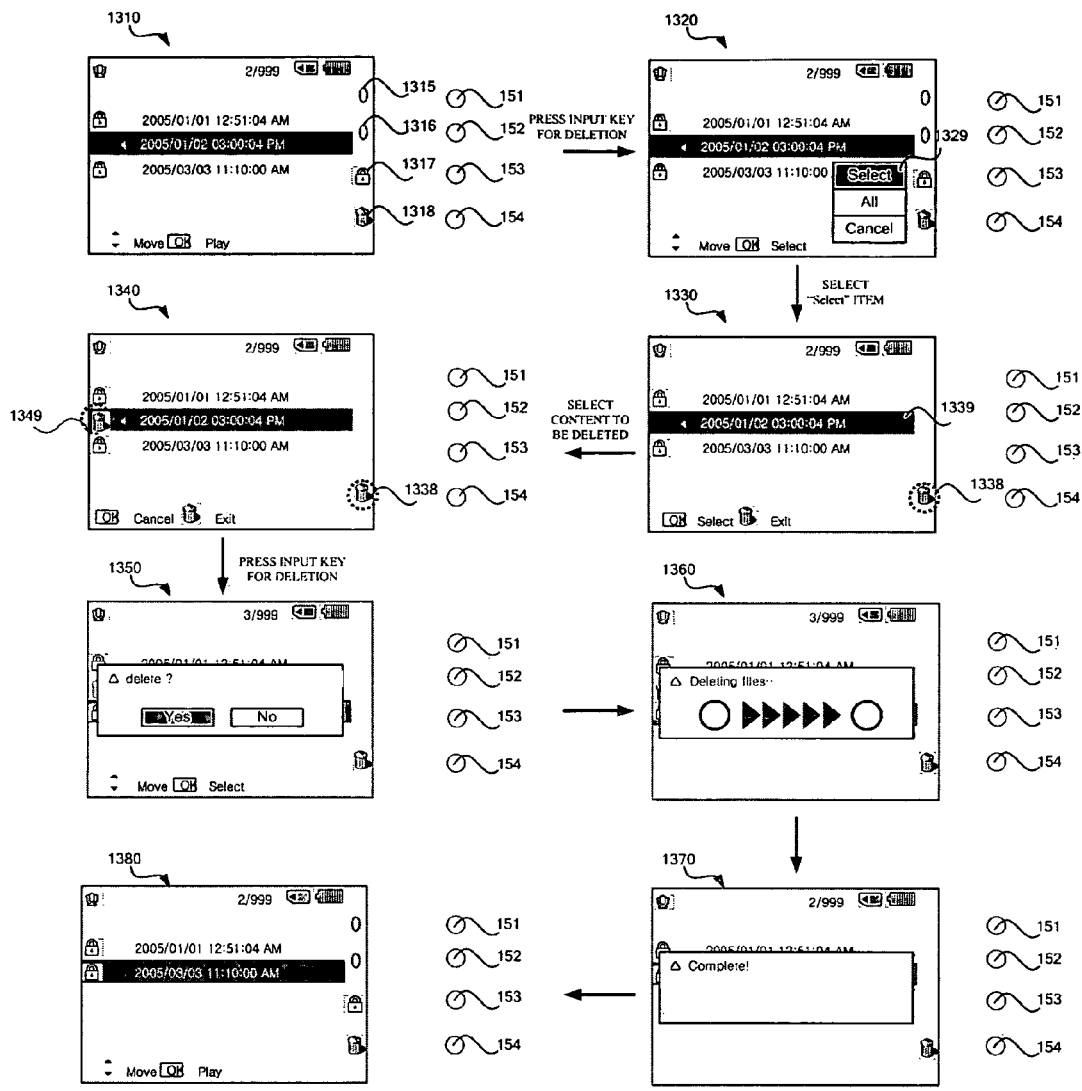
FIG. 13 illustrates a procedure of removing content by operating input keys in the integrated digital device according to an exemplary embodiment of the present invention.

FIG. 13 illustrates a procedure of removing content by operating an input key in an integrated digital device according to an exemplary embodiment of the present invention.

Pressing the fourth input key 154 is required to delete an audio content in the audio recording mode 116. The fourth input key 154 is located near a delete icon 1318. When the fourth input key 154 is pressed on a screen 1310 illustrating a list of recorded audio contents, a sub menu is popped up and a user can select a "Select" item 1329 on a screen 1320. When the "Select" item is selected, a blinking delete icon 1338 corresponding to the fourth input key 154 appears on a screen 1330 to indicate that a mode in which an image to be deleted can be selected has been entered. Since the other input keys 151 through 153 are not necessary, their corresponding icons are removed from the screen 1330 to indicate that the input keys 151 through 153 have been deactivated. When a content 1339 is selected to be deleted on the screen 1330, an icon 1349 is displayed next to the selected content on a screen 1340 to indicate that the selected content is to be deleted. When the fourth input key 154 corresponding to the blinking delete icon 1338 is pressed by the user after completing the selection, the integrated digital device asks the user to confirm the deletion of the selected content on a screen 1350. When the user confirms the deletion, the selected content is deleted from the integrated digital device while a screen 1360 is displayed. A screen 1370 appears when the deletion is completed. A screen 1380 shows the list of audio contents after the deletion.

Figure 14:
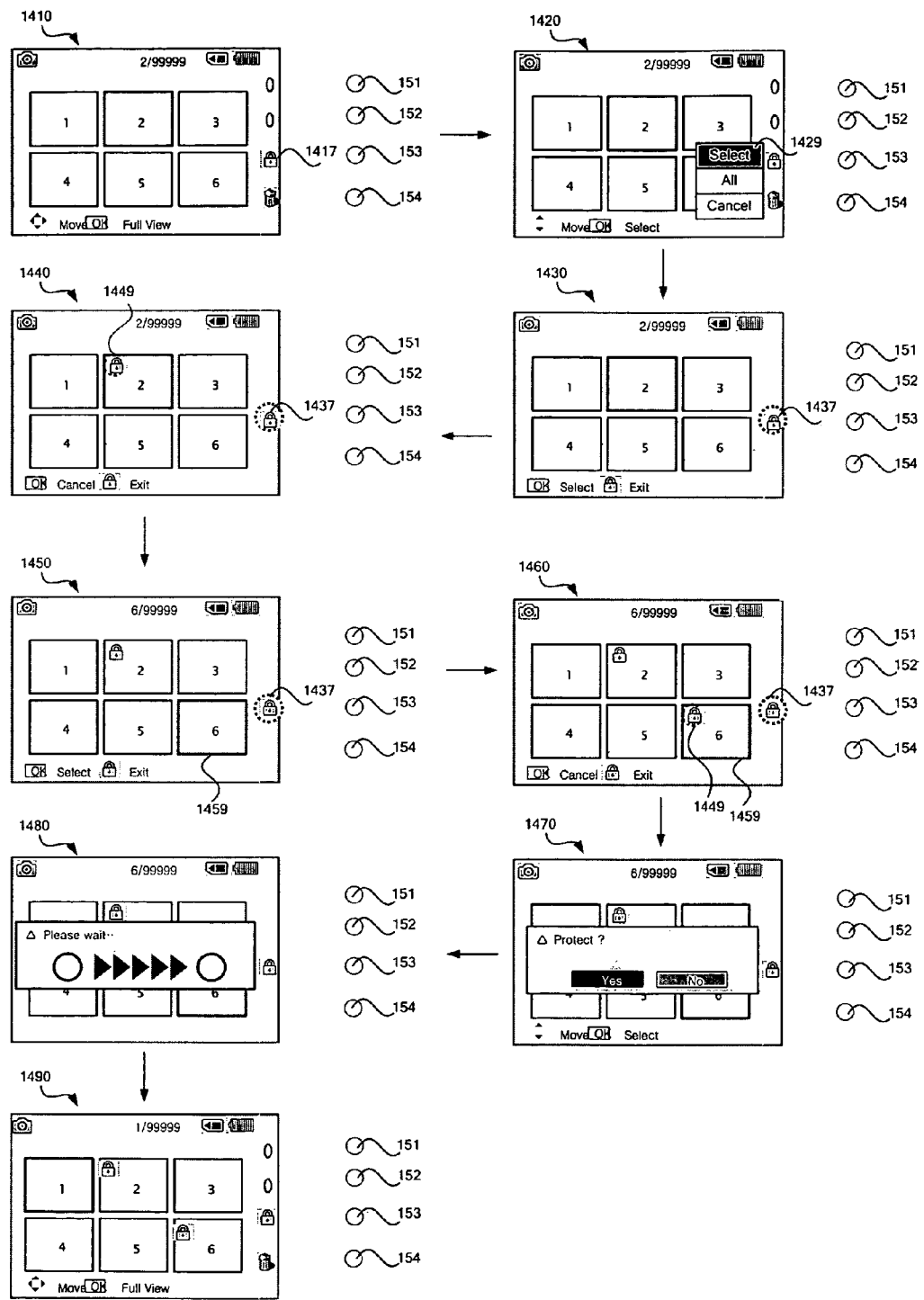
FIG. 14 illustrates a procedure of setting an image erase protection by operating input keys in the digital camera mode of the integrated digital device according to an exemplary embodiment of the present invention.

FIG. 14 illustrates a procedure of setting an image erase protection by operating an input key in the digital camera mode 113 of an integrated digital device according to an exemplary embodiment of the present invention.

When a zoom out function is performed by operating the zoom button 134 in the playback mode of the digital camera mode 113, a thumbnail screen displaying brief information of images stored in the integrated digital device appears.

A user can press the input key 153 near an erase protection icon 1417 to set an image to an erase protection state on the thumbnail screen in the digital camera mode 113. When the input key 153 is pressed on a screen 1410, a sub menu is popped up and the user can select a "Select" item 1429 on a screen 1420 using the four-direction key 161. When the "Select" item 1429 is selected, a blinking erase protection icon 1437 corresponding to the input key 153 appears on a screen 1430 to indicate that a selection mode in which an image to be set to the erase protection state can be selected has been entered. Here, since the other input keys 151, 152, and 154 are not necessary, their corresponding icons are removed to indicate that the input keys 151, 152, and 154 have been deactivated.

When an image to be set to the erase protection state is selected, an erase protection icon 1449 appears on the selected image on a screen 1440. When another image 1459 is also selected on a screen 1450, the erase protection icon 1449 also appears on the selected image 1459 on a screen 1460. Thereafter, the input key 153 is pressed, the selection mode ends and the selected images are set to the erase protection state (screens 1470 and 1480). A screen 1490 shows that the two selected images have been set to the erase protection state.

According to an exemplary embodiment of the present invention, an integrated digital device can enter into a file browser mode through a menu. In the file browser mode, a user may search folders generated by types of contents to find a content to be played among various types of contents. For example, images taken in the digital camera mode 113 may be stored in a picture folder; videos taken in the digital camcorder mode 114 may be stored in a video folder, a list of receivable DMB channels may be stored in a DMB channel folder; and MP3 files may be stored in a music folder. When a user selects the file browser mode, folders respectively storing different types of contents are displayed. If the user selects a particular video in the video folder, the selected video is played. If the user selects a particular MP3 file in the music folder, the selected MP3 file is played. If the user selects a particular channel in the DMB channel folder, a DMB signal of the selected channel is received and displayed.

Figure 16:
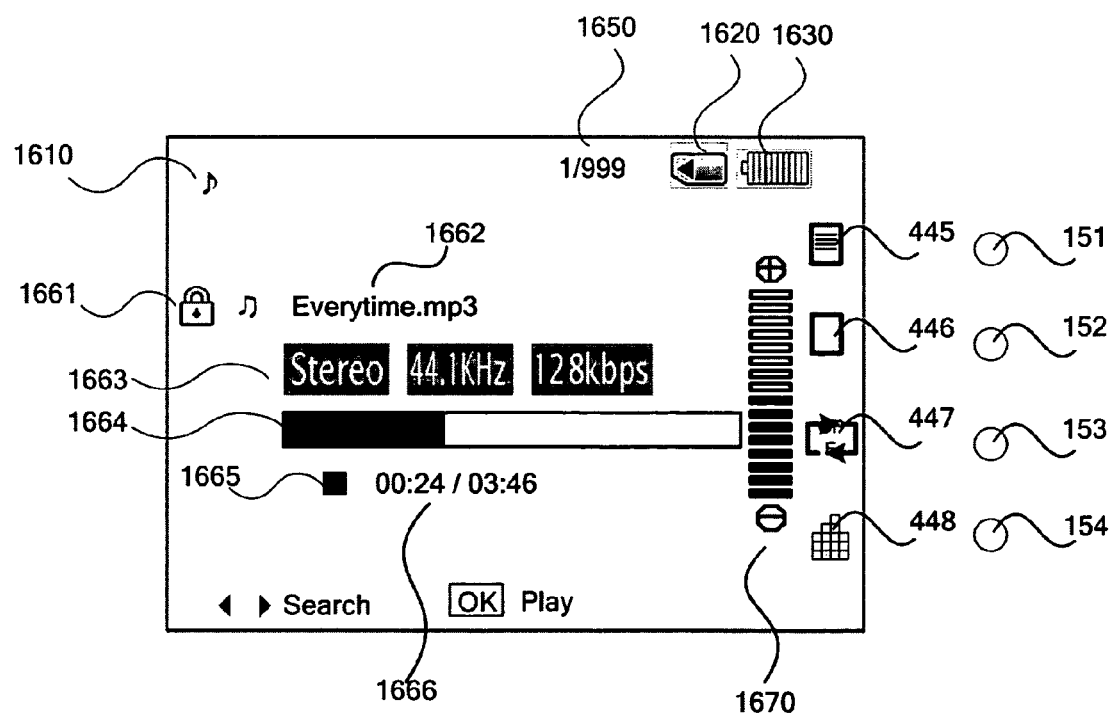

When an integrated digital device according to an exemplary embodiment of the present invention is set to the MP3 player mode 115 by the operation of the mode dial 110, an LCD displays information on an MP3 file that was played last time. FIG. 16 illustrates a screen of the MP3 player mode in which the information on the MP3 file played last time is output. The screen of the MP3 player mode may include an icon 1610 indicating the MP3 player mode and an information item ("current file number/the number of all MP3 files") 1650 indicating a place of a current file in stored MP3 files. The screen of the MP3 player mode may also include an icon 1620 indicating a type of memory storing the current MP3 file, an icon 1630 indicating the charge state of a battery, the icons 445 through 448 respectively indicating current functions of the respective input keys 151 through 154, and detailed information items 1661 through 1666 regarding the current MP3 file.

In the MP3 player mode 115, the first input key 151 selects whether to display detailed information on an MP3 file played currently or whether to display a list of all stored MP3 files. The second input key 152 selects whether to enter a mode in which a playlist defined by a user can be changed. The third input key 153 selects one repeated playback mode among "no repeat", "repeat one", "repeat group", "repeat all", and "repeat random". The fourth input key 154 selects one equalizer mode among "normal", "pop", "jazz", and "classic". Meanwhile, when a playlist display mode is entered by the second input key 152, the fourth input key 154 functions as a delete key which deletes an MP3 file on a playlist.

Detailed information on an MP3 file includes a name 1662 of the MP3 file, an erase protection icon 1661 indicating whether the MP3 file has been set to an erase protection state, information 1663 indicating the frequency and the bit rate of the MP3 file, a bar 1664 indicating a current playback position of the MP3 file, an icon 1665 indicating a playback state, such as "play" or "stop", of the MP3 file, and a counter 1666 indicating a current play time in a total play time of the MP3 file. An integrated digital device according to an exemplary embodiment of the present invention memorizes a stop position of an MP3 file played last time. Thereafter, when the MP3 player mode 115 is selected again, the integrated digital device enters into the MP3 playback mode. In this state, if a user presses an OK button provided at the center of the four-direction key 161, the MP3 file is played starting from the last stop position.

The user can control the level of volume by pressing up and down buttons of the four-direction key 161 while the MP3 file is being played. The level of volume may be displayed in a form 1670.

Figure 15:
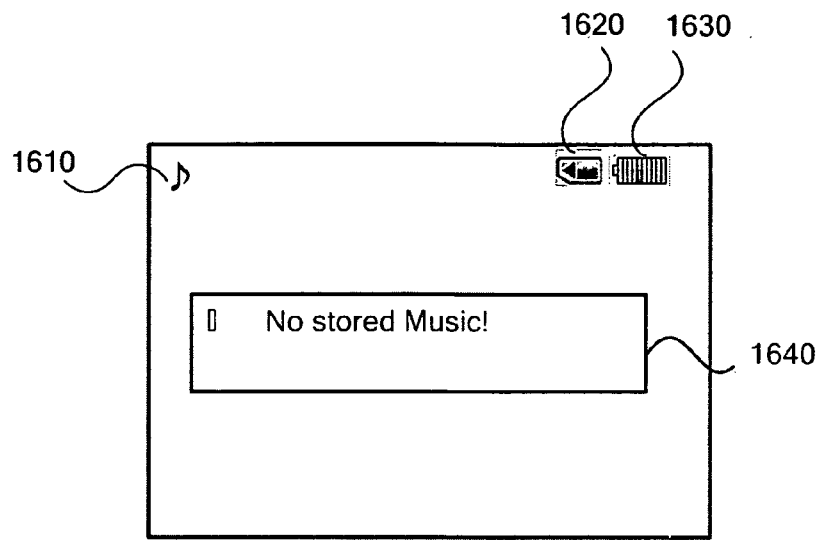
FIGS. 15 and 16 illustrate screens displayed when the integrated digital device changes into the MP3 player mode, according to an exemplary embodiment of the present invention.

Meanwhile, when a user initially selects the MP3 player mode 115 after downloading an MP3 file in the integrated digital device, a first MP3 file in a highest folder is selected among MP3 files stored in the integrated digital device and a screen as shown in FIG. 16 is displayed. If there is no stored MP3 file when the user selects the MP3 player mode 115 by operating the mode dial 110, the integrated digital device outputs a message 1640 reporting that there is no stored MP3 file on a screen, as shown in FIG. 15.

Figure 17:
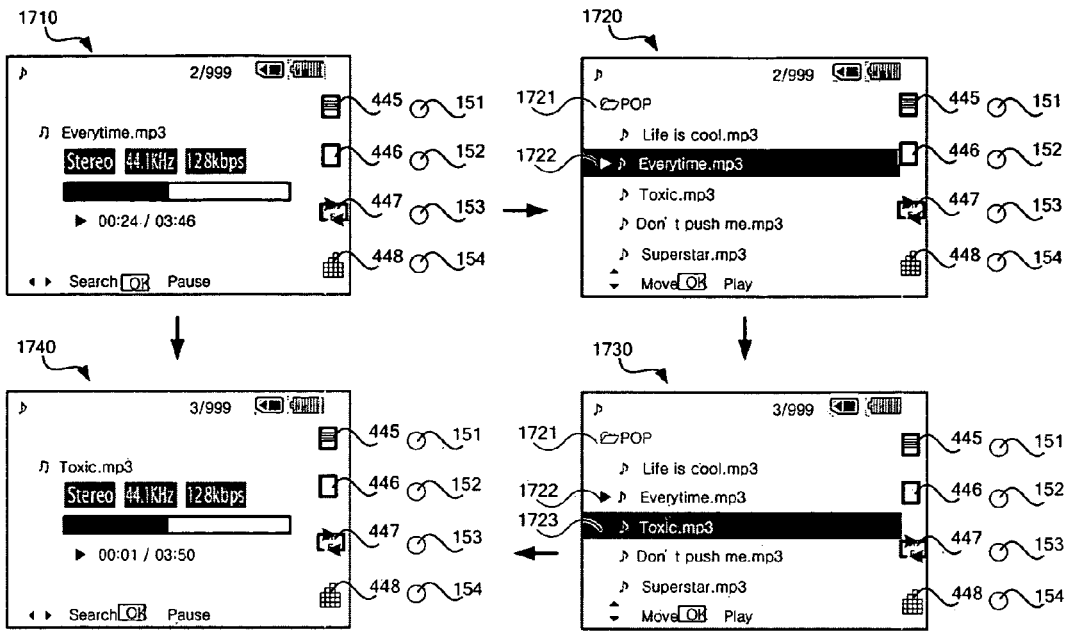
FIG. 17 illustrates a procedure of displaying the list of music contents and playing music by operating input keys in the MP3 player mode of the integrated digital device according to an exemplary embodiment of the present invention.

FIG. 17 illustrates a procedure of displaying the list of music contents and playing music by operating input keys in the MP3 player mode 115 of an integrated digital device according to an exemplary embodiment of the present invention.

When the first input key 151 is pressed while an MP3 file is played or stopped on a screen 1710, the screen 1710 is converted to a screen 1720 displaying a list of stored MP3 files. On the screen 1720, a mark 1722 indicating that a file is being played is displayed in front of the name of a file that is currently being played on the list and a highlight is positioned on the file name. Accordingly, a user can recognize from the screen 1720 that a currently played MP3 file is "Everytime.mp3" in a "POP" folder 1721. When the user selects another MP3 file 1723 using the up and down buttons of the four-direction key 161 on a screen 1730 displaying the list of MP3 files and then presses the OK button at the center of the four-direction key 161, the screen 1730 is converted to a screen 1740 displaying detailed information on the selected MP3 file and simultaneously the selected MP3 file is played. Meanwhile, when the user presses the up or down button of the four-direction key 161 while an MP3 file is stopped, a previous or subsequent MP3 file is played and a screen displaying information on it appears. For example, when the user presses the down button of the four-direction key 161 while the file "Everytime.mp3" is stopped on the screen 1710, a subsequent file "Toxic.mp3" on the list is played on a screen 1740.

In addition, when the user presses the left or right button of the four-direction key 161 for at least three seconds while an MP3 file is being played, the MP3 file is played in fast reverse of forward. When the user presses the left or right button of the four-direction key 161 for at least three seconds while an MP3 file is stopped, the user can quickly search MP3 files backward or forward.

Figure 18:
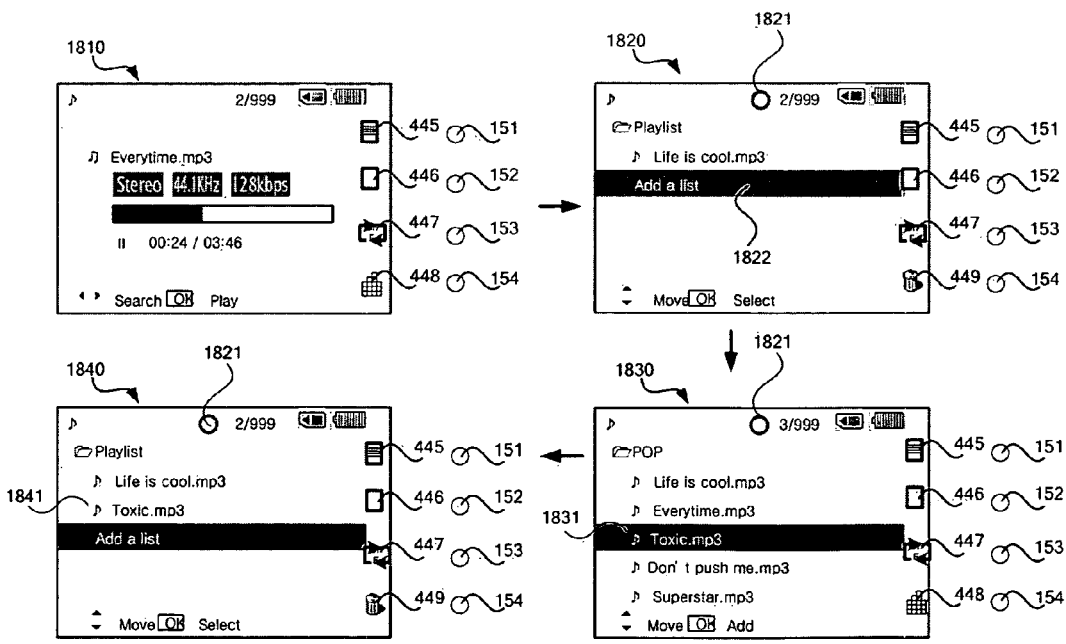
FIG. 18 illustrates a method of generating a user playlist including music titles preferred by a user in the MP3 player mode of the integrated digital device according to an exemplary embodiment of the present invention.

FIG. 18 illustrates a method of generating a user playlist including music titles preferred by a user in the MP3 player mode 115 of an integrated digital device according to an exemplary embodiment of the present invention.

When a user presses the second input key 152 while an MP3 file is being played or stopped on a screen 1810 or while a file list screen is displayed, a playlist screen 1820 appears with a highlighted item "Add a list" 1822 at the end of a playlist. On the playlist screen 1820, an icon 1821 indicating a playlist mode is displayed at the top and the fourth input key 154 is modified to perform deletion.

When the OK button is pressed while the "Add a list" 1822 is highlighted, the playlist screen 1820 is converted to a screen 1830 displaying a list of stored MP3 files so that the user can select a file to be added to the playlist. Here, an MP3 file that was played last time is highlighted on the screen 1830. When the user locates a highlight 1831 on an MP3 file to be added to the playlist using the up and down buttons of the four-direction key 161 and then presses the OK button, the highlighted MP3 file is added to the playlist. Referring to FIG. 18, the user selects an MP3 file "Toxic.mp3" in the "POP" folder on the screen 1830. A screen 1840 shows that an item 1841 of "Toxic.mp3" has been added to the playlist.

FIG. 19 illustrates a procedure of playing an MP3 file on a user playlist in the MP3 player mode 115 of an integrated digital device according to an exemplary embodiment of the present invention. Playing an MP3 file on a user playlist screen is similar to playing an MP3 file on a file list screen. When a user presses the second input key 152 in the MP3 player mode 115, a playlist screen 1910 comprising a highlight "Add a list" item 1822 appears. A screen 1920 shows a state where the user selects an item 1921 of an MP3 file to be played by moving a highlight using the four-direction key 161. When the item 1921 is selected, the screen 1920 is converted into a play mode screen 1930 and the selected MP3 file is played. Here, a mark 1931 indicating that the current MP3 file has been registered in the user playlist is displayed in front of information on the current MP3 file.

Figure 20:
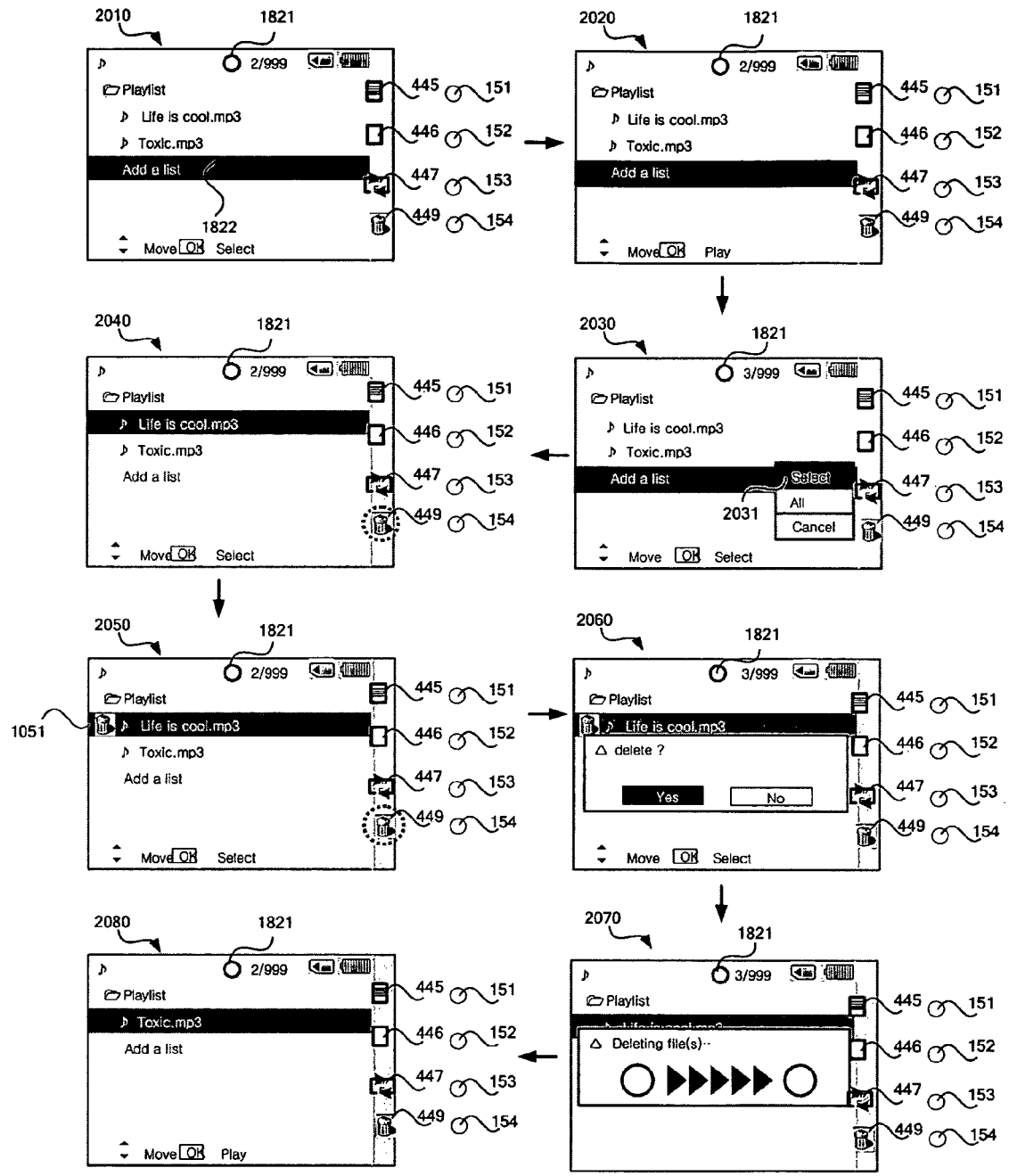
FIG. 20 illustrates a procedure of deleting an item from a user playlist in the MP3 player mode of the integrated digital device according to an exemplary embodiment of the present invention.

FIG. 20 illustrates a procedure of deleting an item from a user playlist in the MP3 player mode 115 of an integrated digital device according to an exemplary embodiment of the present invention.

A user playlist screen 2010 appears when a user presses the second input key 152 in the MP3 player mode 115. Thereafter, when the user presses the fourth input key 154 on a screen 2020, a sub menu is popped up on a screen 2030. When a "Select" item 2031 is selected, the icon 449 corresponding to the fourth input key 154 blinks to indicate that the user can select an item to be deleted from the user playlist on a screen 2040. When the user selects an item to be deleted and presses the OK button, an icon 2051 indicating that a corresponding item will be deleted appears in front of the selected item on a screen 2050. When the user presses the fourth input key 154 again, the selection of the item is completed and a message for confirming the deletion of the selected item appears on a screen 2060. When the user confirms the deletion, the selected item is deleted from the user playlist on a screen 2070. A screen 2080 shows the user playlist from which the selected item has been deleted. Here, an actual MP3 file corresponding to the item deleted from the playlist is not actually erased from the integrated digital device but just disappears from the user playlist.

Figure 22:
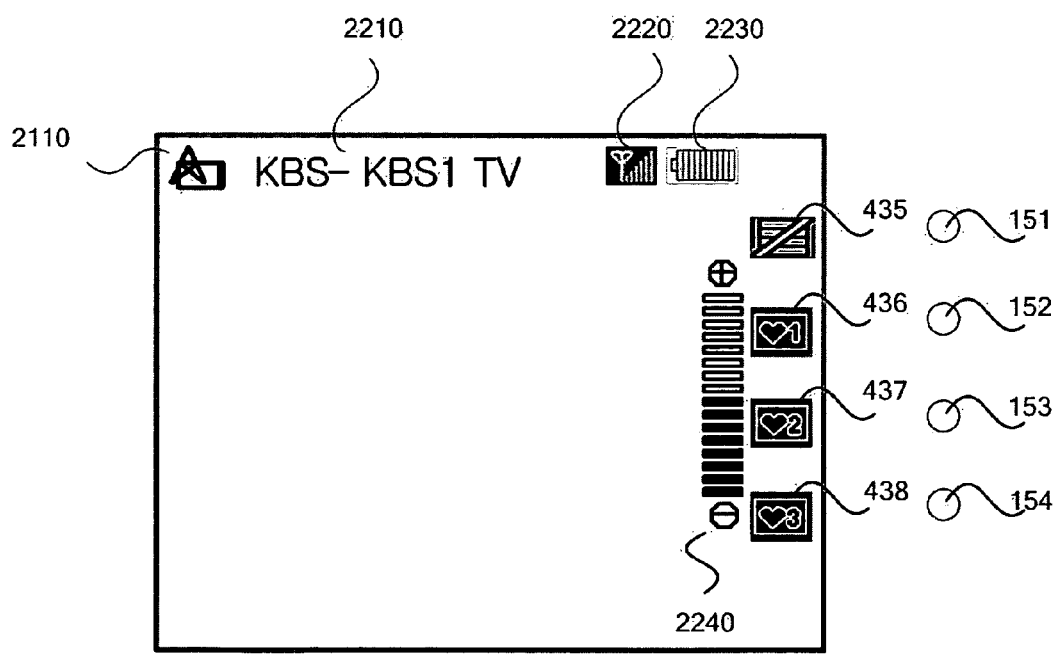
FIG. 22 illustrates a screen on which a broadcasting channel output last time is output when the DMB receiver mode is selected in the integrated digital device according to an exemplary embodiment of the present invention.

According to an exemplary embodiment of the present invention, when an integrated digital device is set to the DMB receiver mode 112 by the operation of the mode dial 110, the integrated digital device outputs a DMB signal of a broadcasting channel that was previously output. FIG. 22 illustrates a screen on which the previous broadcasting channel is output in the DMB receiver mode 112. The screen of the DMB receiver mode 112 may include an icon 2110 indicating a current mode is the DMB receiver mode, an information item 2110 regarding a current DMB channel, an icon 2220 indicating the intensity of a current DMB signal, an icon 2230 indicating the charge state of a battery, the icon 435 indicating the type of channel list to be displayed on a screen, and the icons 436 through 438 corresponding to the second through fourth input keys 152 through 154 that register favorite channels, respectively. The icon 435 corresponding to the first input key 151 may be changed according to the type of channel list selected by pressing the first input key 151. This operation will be described in detail with reference to FIG. 25.

A user can control a volume level by pressing the up and down buttons of the four-direction key 161 while a DMB signal is being output. The volume level may be displayed in a form 2240.

Figure 21:
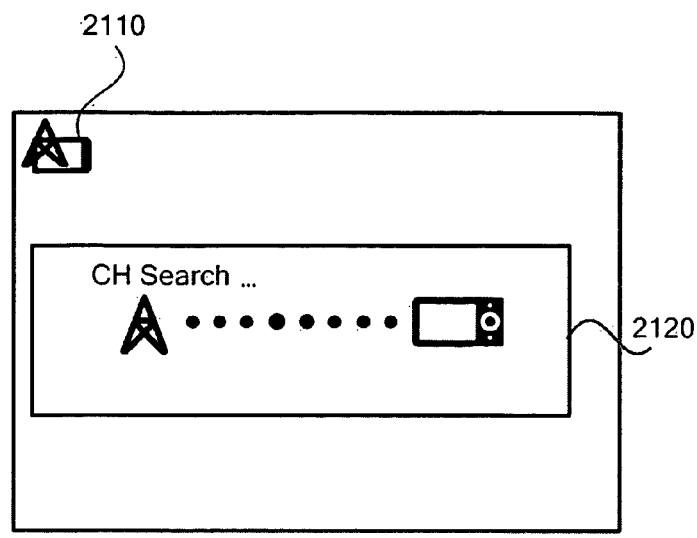
FIG. 21 illustrates a screen showing that signals of broadcasting channels are searched for when the DMB receiver mode is initially selected in the integrated digital device according to an exemplary embodiment of the present invention.

When the DMB receiver mode 112 is selected, a screen illustrating that the integrated digital device finds a receivable channel list, searches for broadcasting signals of channels included in the receivable channel list in order of alphabet, and outputs a broadcasting signal of a channel coming first in order of alphabet. However, the channel search order is not restricted to the alphabetical order but may be determined by a manufacturer of the integrated digital device or broadcasting policy. FIG. 21 illustrates a screen displayed while signals of broadcasting channels are searched for in the integrated digital device according to an exemplary embodiment of the present invention. The icon 2110 indicates that a current mode is the DMB receiver mode 112 and a box 2120 shows the integrated digital device is searching for a broadcasting channel to be output.

Figure 23:
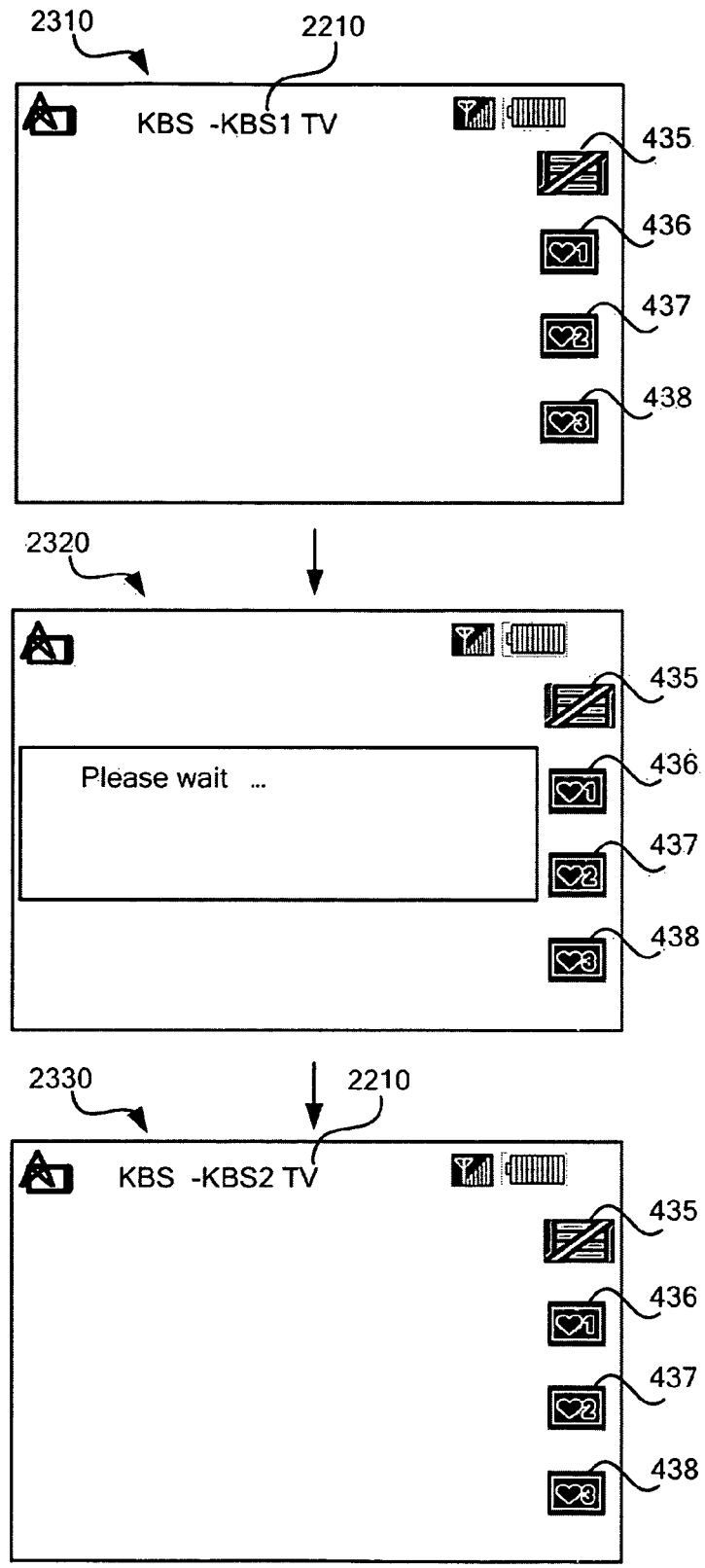
FIG. 23 illustrates a procedure of changing a channel using direction keys in the DMB receiver mode of the integrated digital device according to an exemplary embodiment of the present invention.

FIG. 23 illustrates a procedure of changing a channel using the four-direction key 161 in the DMB receiver mode 112 of an integrated digital device according to an exemplary embodiment of the present invention.

In the integrated digital device, a user can change a DMB channel using the four-direction key 161 while a DMB signal is output. For example, when the user presses the right button of the four-direction key 161 while watching KBS1 TV (2210) on a screen 2310, the integrated digital device searches for a signal of a broadcasting channel following the KBS1 TV (2210) on a channel list on a screen 2320. A screen 2330 shows a state in which a signal of KBS2 TV (2210) is received and output.

Figure 24:
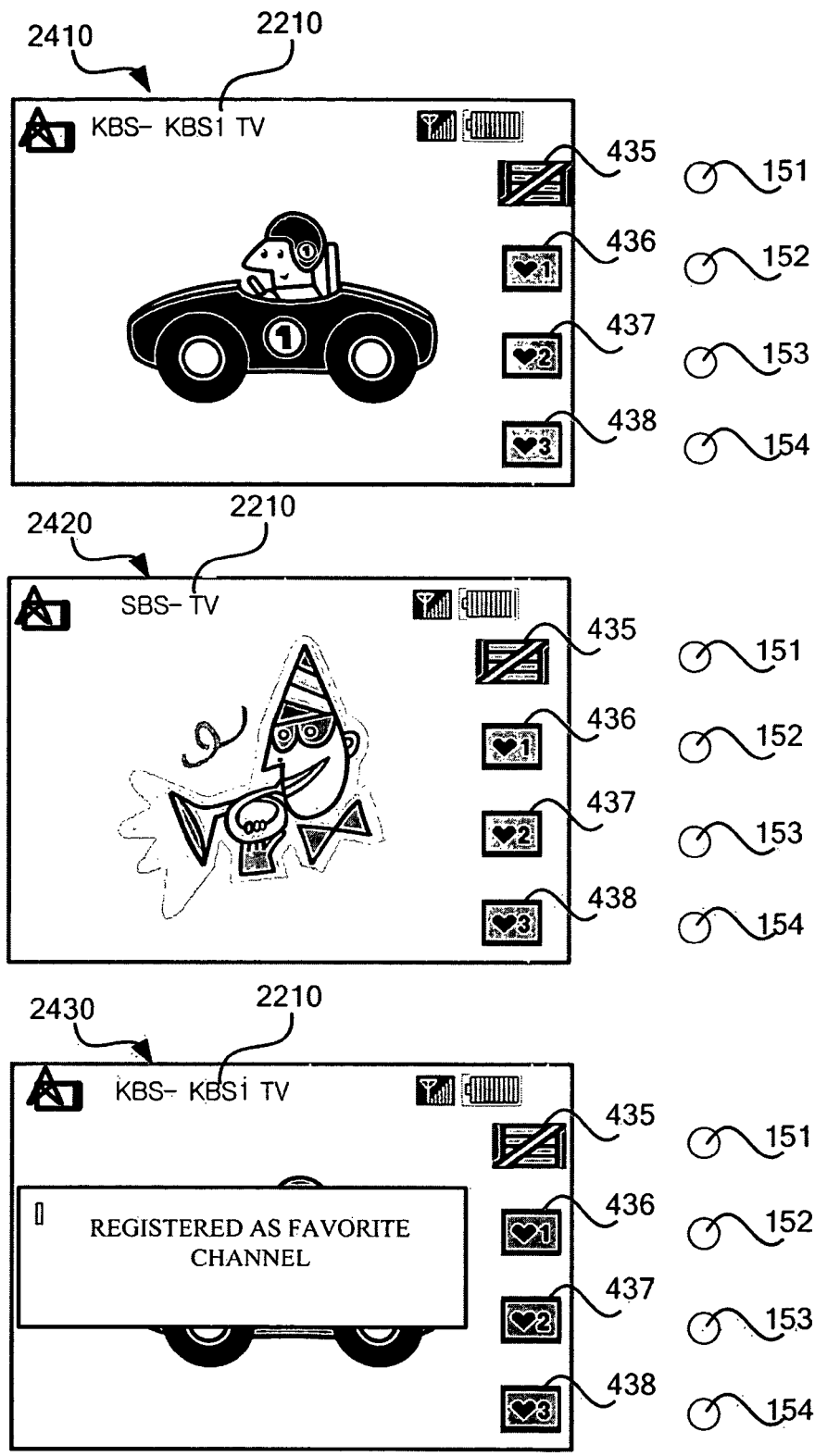
FIG. 24 illustrates a method of registering a favorite channel and a method of shifting to a favorite channel using input keys in the DMB receiver mode of the integrated digital device according to an exemplary embodiment of the present invention.

FIG. 24 illustrates a method of registering a favorite channel and a method of shifting to a favorite channel using input keys in the DMB receiver mode 112 of an integrated digital device according to an exemplary embodiment of the present invention.

When a user quickly presses the second input key 152 while watching a KBS1 TV channel on a screen 2410, the screen 2410 is shifted to a screen 2420 of a first favorite channel registered in the second input key 152. When there is no favorite channel registered in the second input key 152, a message reporting that there is no favorite channel registered to the second input key 152 may be output. This operation is also applied to the third and fourth input keys 153 and 154. Accordingly, while watching a broadcasting channel, the user can easily shift to a favorite channel that he or she has registered through a simple operation of pressing one of the second through fourth input keys 152 through 154.

If the user continuously presses one of the second through fourth input keys 152 through 154 while watching the KBS1 TV channel, the KBS1 TV channel is registered in the pressed input key as a favorite channel on a screen 2430.

Figure 25:
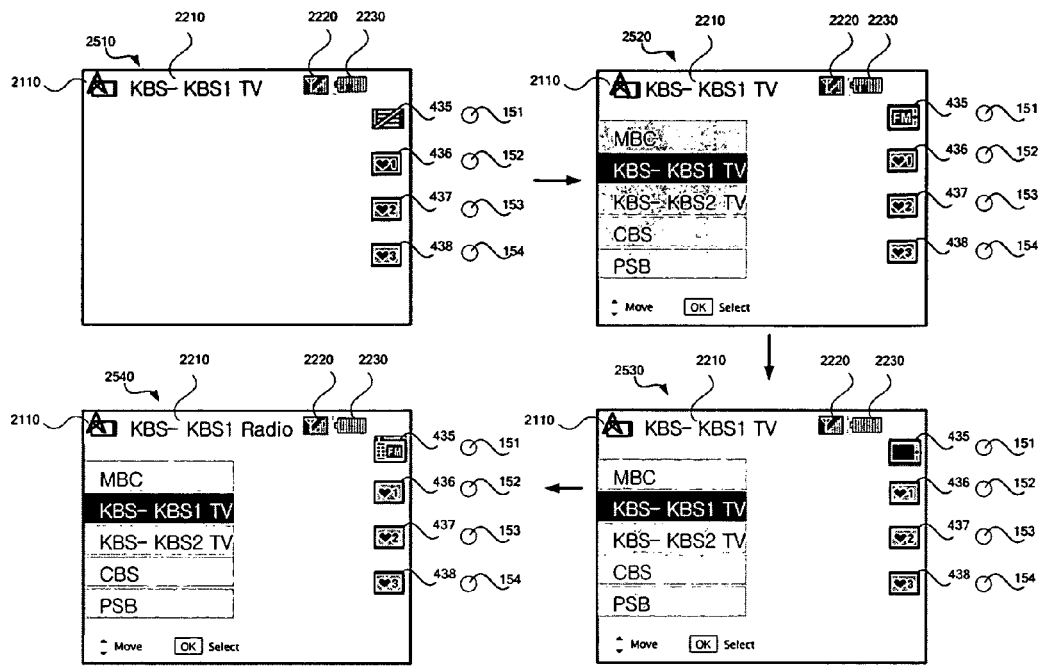
FIG. 25 illustrates a procedure in which the display of a channel list is changed using input keys in the DMB receiver mode of the integrated digital device according to an exemplary embodiment of the present invention.

FIG. 25 illustrates a procedure in which the display of a channel list is changed using an input key in the DMB receiver mode 112 of an integrated digital device according to an exemplary embodiment of the present invention.

In the DMB receiver mode 112 of the integrated digital device according to an exemplary embodiment of the present invention, the first input key 151 is used to select a display type of channel list. When the integrated digital device is set to the DMB receiver mode 112 by the operation of the mode dial 110, a screen 2510 outputting a broadcasting channel that was output last time appears in the integrated digital device, as described above with reference to FIG. 22. Here, the icon 435 corresponding to the first input key 151 indicates that the channel list is not displayed.

When a user presses the first input key 151, a list of all receivable video and audio broadcasting channels is displayed on a screen 2520. The icon 435 on the screen 2520 indicates that a displayed list includes all of the receivable video and audio broadcasting channels. If the user presses the first input key 151 on the screen 2520, a list of video channels is displayed on a screen 2530. If the user presses the first input key 151 on the screen 2530, a list of audio channels is displayed on a screen 2540. If the user presses the first input key 151 on the screen 2540, the integrated digital device returns to the initial screen 2510 that does not display any channel list. The order in which the type of channel list changes is just an example and it is apparent to those skilled in the art that the type of channel list may change in other orders. The icon 435 on the screen 2530 indicates that a video broadcasting channel list is displayed and the icon 435 on the screen 2540 indicates that an audio broadcasting channel list is displayed.

Figure 26:
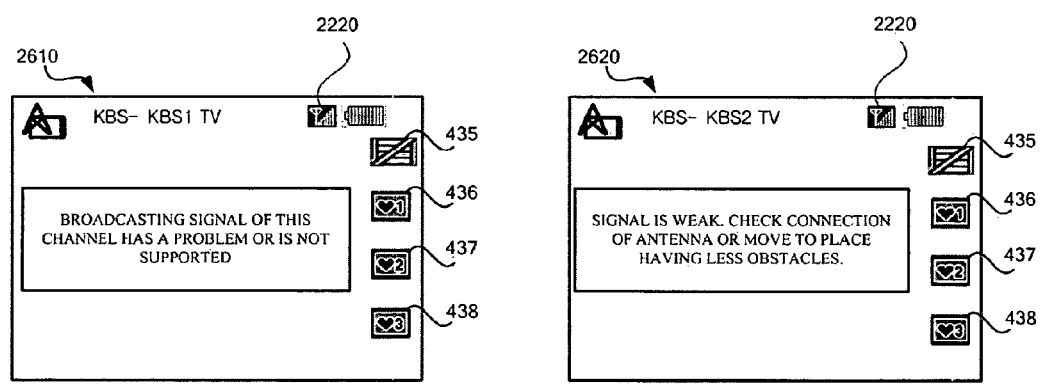
FIG. 26 illustrates screens each showing a state of a broadcasting signal received in the DMB receiver mode of the integrated digital device according to an exemplary embodiment of the present invention.

FIG. 26 illustrates screens which each illustrate a state of a broadcasting signal received in the DMB receiver mode 112 of an integrated digital device according to an exemplary embodiment of the present invention.

The integrated digital device outputs messages reporting problems when a received broadcasting signal is weak or has a problem. For example, when a received broadcasting signal has a format that is not supported by the integrated digital device, the integrated digital device outputs messages reporting problems of the broadcasting signal as shown on screens 2610 and 2620. Meanwhile, the icon 2220 informs a user of the intensity of a broadcasting signal by changing the number of vertical bars according to the intensity of the broadcasting signal.

The icons indicating the states of the integrated digital device are not restricted to particular shapes described above but may have any other symbolical shapes that can express corresponding information.

Figure 27:
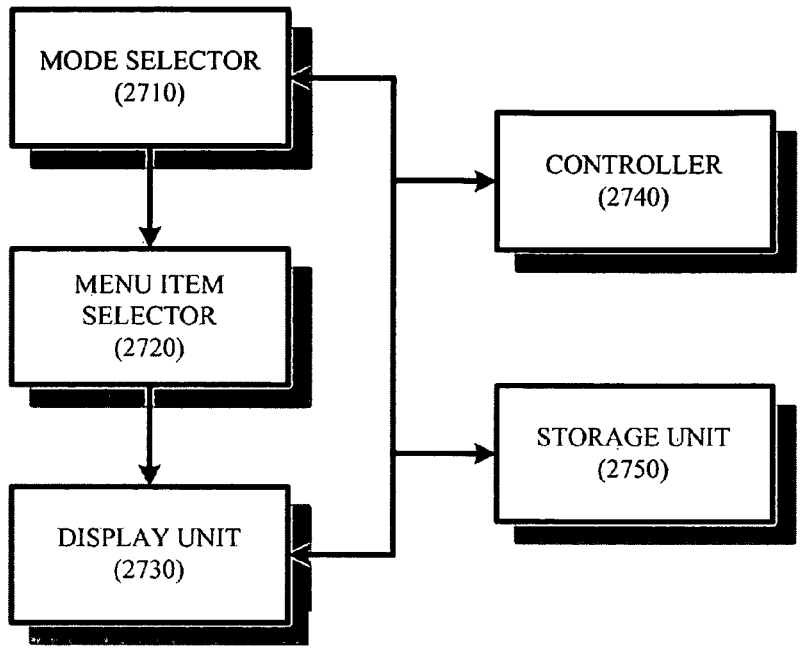
FIG. 27 is a block diagram of a digital device using a menu display method, according to an exemplary embodiment of the present invention.

FIG. 27 is a block diagram of an integrated digital device using a menu display method, according to an exemplary embodiment of the present invention.

The integrated digital device may include a mode selector 2710, a menu item selector 2720, a display unit 2730, a controller 2740, and a storage unit 2750.

The mode selector 2710 selects one among a plurality of modes in which different functions are performed. The mode selector 2710 may be implemented by a mode dial and may allow a user to convert the integrated digital device to a preferred digital device. The user may select one mode from the plurality of modes such as a digital camera mode, a digital camcorder mode, a DMB receiver mode, an MP3 player mode, an audio recorder mode, a USB storage mode, and a PC camera mode in the integrated digital device.

The menu item selector 2720 allows the user to select one menu item in each of a plurality of menu areas displayed in a mode selected by the mode selector 2710.

The display unit 2730 displays icons indicating setup information or operations controlled by input keys and various icons corresponding to the menu items indicating state information of the integrated digital device. Also, the display unit 2730 outputs sub menu items of a menu item selected by the menu item selector 2720 in a first menu area among the plurality of menu areas to a second menu area set at a predetermined position as a sub area of the first menu area on a screen. Here, each menu area is not interpreted in a dynamic concept but is considered as a physically fixed area. For example, the first menu area is fixed, and when each menu item in the first menu area is selected, corresponding sub menu items are displayed in the second menu area that is physically fixed. Substantially, a menu item selected in the first menu area is moved to a predetermined position except positions of menu items at both ends of the first menu area and sub menu items of the selected menu item are displayed in the second menu area fixed below the predetermined position.

Figure 29:
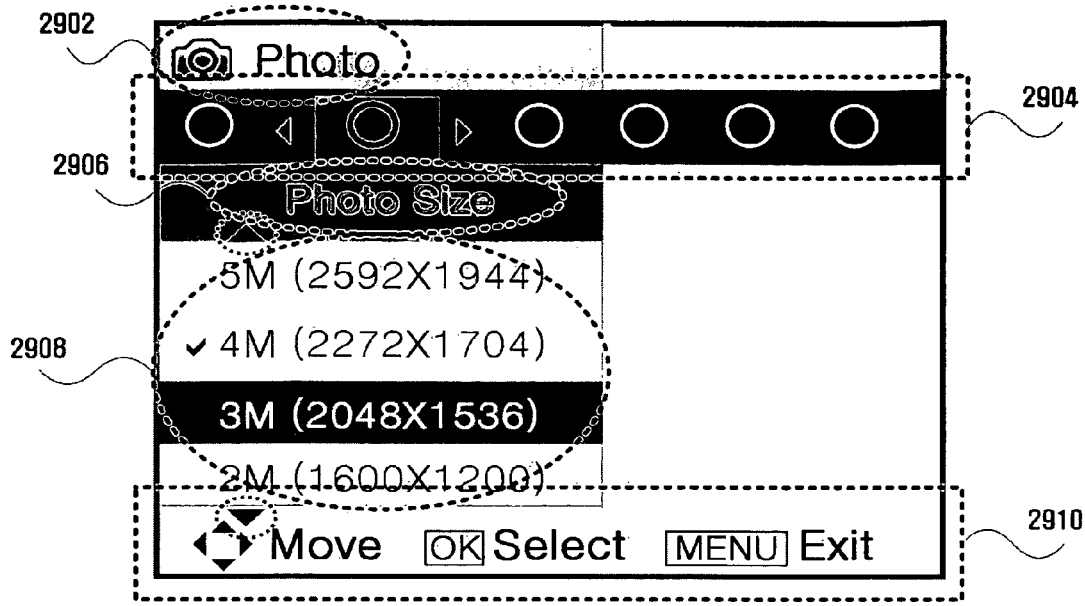
FIG. 29 illustrates the graphical user interface (GUI) configuration of a display unit in a digital device using the menu display method, according to an exemplary embodiment of the present invention.

Meanwhile, the display unit 2730 includes a graphical user interface (GUI) displayed on a display device such as an LCD. The GUI may be divided into several areas. These areas will be described with reference to FIG. 29. FIG. 29 illustrates the GUI configuration of a display unit in an integrated digital device using a menu display method, according to an exemplary embodiment of the present invention.

A mode display area 2902 displays a mode selected by a user from a plurality of modes in which different functions are performed. In FIG. 29, the mode display area 2902 displays that the digital camera mode is selected.

A first menu area 2904 displays main menu items of a selected mode in an upper portion of the GUI at predetermined intervals in a horizontal direction. The main menu items are expressed by alphabet characters A through F on one screen in FIG. 30A. When one main menu item in the first menu area 2904 is selected by the menu item selector 2720, the display unit 2730 enlarges the selected main menu item and changes the brightness in the first menu area 2904.

The main menu items in the first menu area 2904 are displayed in a form of icons indicating properties of the respective main menu items.

A second menu area 2908 displays sub menu items, which belong to the main menu item selected in the first menu area 2904, and has a fixed position as a sub area of the first menu area 2904 on the screen. In particular, the second menu area 2908 is positioned below a particular position among positions of the main menu items. The exceptions are the two main menu items at the left and right ends of the first menu area 2904. In other words, when a main menu item in the first menu area 2904 is selected, the selected main menu item is shifted to the particular position in the first menu area 2904 and sub menu items of the main menu item are arranged below the particular position in a vertical direction.

Accordingly, the selected main menu item is shifted to the particular position regardless of its original position in the first menu area 2904 and its sub menu items are displayed below the fixed particular position. The selected main menu is always shifted to and located at this fixed particular position. The left and right end positions for main menus in the first menu area 2904 are not suitable for the fixed particular position because information of sub menu items may be hidden and not shown at the left or right end of the second menu area 2908 positioned below the fixed particular position.

A menu name area 2906 is positioned between the first menu area 2904 and the second menu area 2908 to display the name of a main menu selected in the first menu area 2904. An auxiliary menu area 2910 is defined at the bottom of the GUI.

The controller 2740 controls the integrated digital device according to setup information set by the mode selector 2710 and input keys. Also, the controller 2740 generates icons indicating setup information corresponding to the input keys and icons indicating menu items and outputs the generated icons to-the display unit 2730 so that the display unit 2730 displays them.

The storage unit 2750 stores the setup information and contents such as images, video, and audio to be displayed on the display unit 2730.

In FIG. 27, various components include, but are not limited to, software or hardware components, such as a Field Programmable Gate Arrays (FPGAs) or Application Specific Integrated Circuits (ASICs), which perform certain tasks. The components may advantageously be configured to reside on the addressable storage media and configured to execute on one or more processors. The functionality of the components and modules may be combined into fewer components and modules or further separated into additional components and modules.

Figure 28:
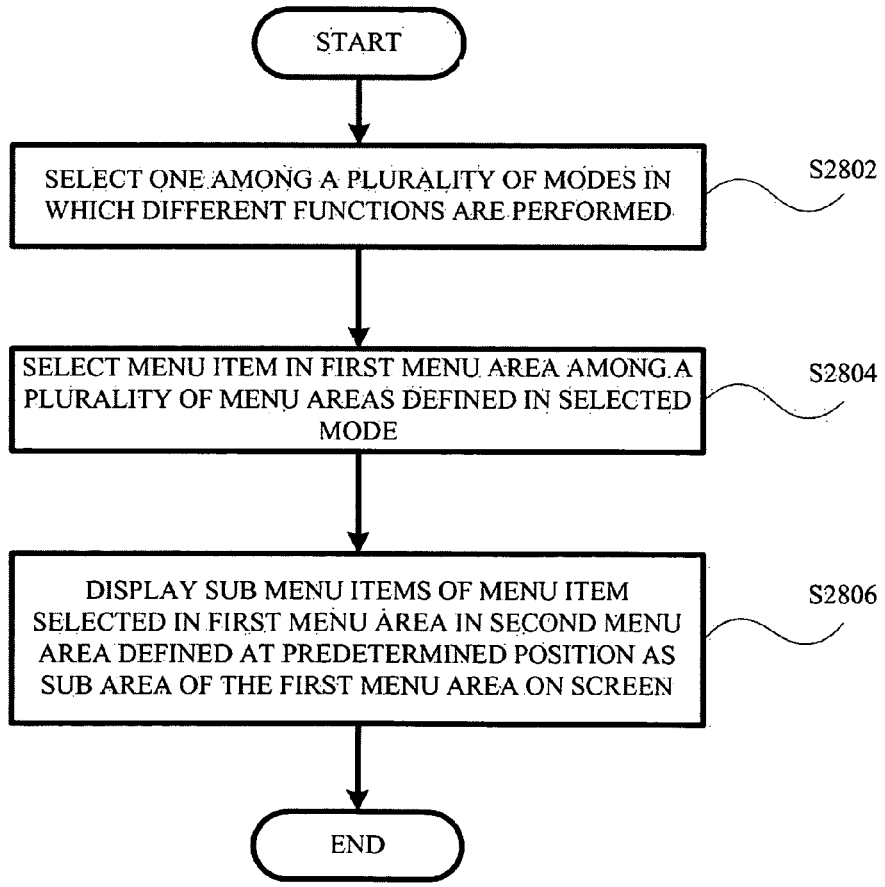
FIG. 28 is a flowchart of a method of displaying a menu according to an exemplary embodiment of the present invention.

FIG. 28 is a flowchart of a method of displaying a menu according to an exemplary embodiment of the present invention.

In the menu displaying method, one menu is selected from a plurality of modes in which different functions are performed in operation S2802.

One menu item is selected in the first menu area 2904 among a plurality of menu areas displayed in the selected mode in operation S2804. Sub menu items of the menu item selected in the first menu area 2904 are displayed in the second menu area 2908 defined at a predetermined position as a sub area of the first menu area 2904 on a screen in operation S2806. For example, when each of the menu items is selected in the first menu area 2904, sub menu items corresponding to the selected menu item are always displayed in the second menu area 2908 whose position is fixed on the screen. As described above, the second menu area 2908 is positioned below a particular position among positions of the main menu items except two main menu items at the left and right ends of the first menu area 2904.

When a menu item is selected in the first menu area 2904, the selected menu item may be enlarged and brighter or darker than any other menu items in the first menu area 2904 to allow a user to easily recognize the menu item that has been selected. Each of the menu items in the first menu area 2904 may be displayed in a form of an icon indicating the property of the menu item.

The above-described method of displaying a menu will be described in detail with reference to FIGS. 30A through 30C, which illustrate screens displayed according to the menu display method.

Figure 30A:
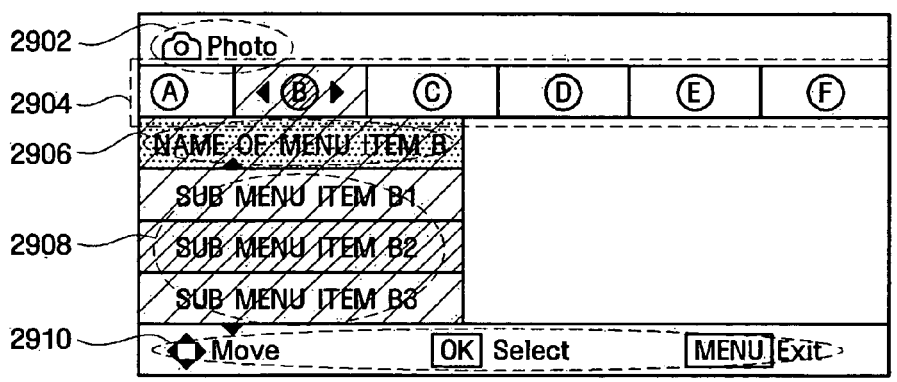
FIGS. 30A through 30C illustrate screens displayed using the menu display method, according to an exemplary embodiment of the present invention.
Figure 30B:
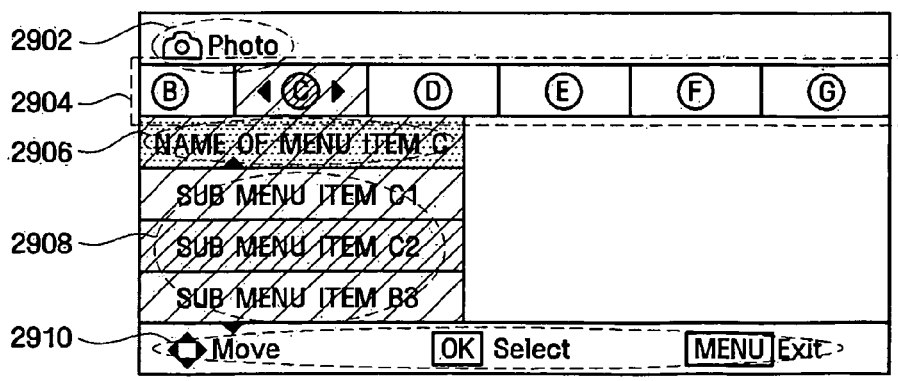
Figure 30C:
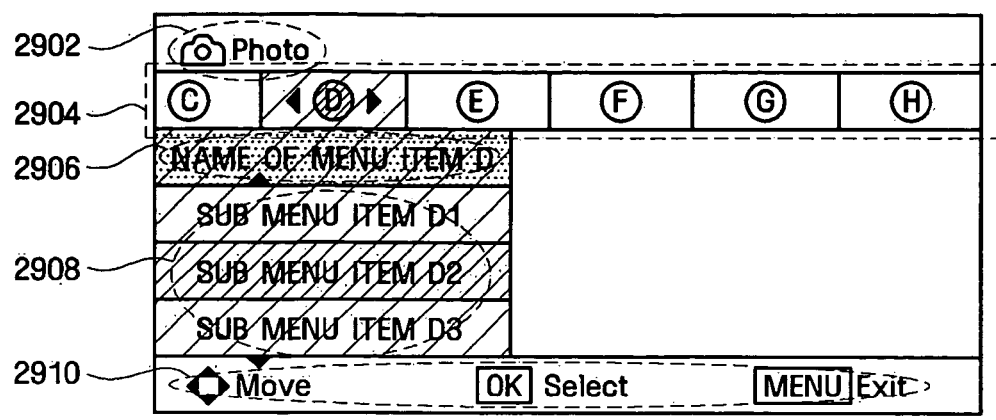

Referring to FIGS. 29 through 30C, in an integrated digital device according to an exemplary embodiment of the present invention, the first menu area 2904 extends in the horizontal direction so that menu items are arranged in a horizontal line. In this state, when each of the menu items in the first menu area 2904 is sequentially selected by the menu item selector 2720, sub menu items of the selected menu item are always displayed in the second menu area 2908. For example, when any one of the menu items B, C, and D is selected, the selected menu item B, C, or D is always shifted to the second place from the left in the first menu area 2904, such as, the position of the menu item B shown in FIG. 30A and sub menu items of the selected menu item B, C, or D are displayed below the position of the selected menu item B, C, or D.

Referring to FIG. 30A, the menu item B is selected in the first menu area 2904 and its sub menu items B1, B2, and B3 are displayed in the second menu area 2908. Referring to FIG. 30B, the menu item C selected in the first menu area 2904 is shifted to the second place where the menu item B is positioned in FIG. 30A and its sub menu items C1, C2, and C3 are displayed in the second menu area 2908. Referring to FIG. 30C, the menu item D selected in the first menu area 2904 is shifted to the second place where the menu item B is positioned in FIG. 30A and its sub menu items D1, D2, and D3 are displayed in the second menu area 2908.

Figure 31:
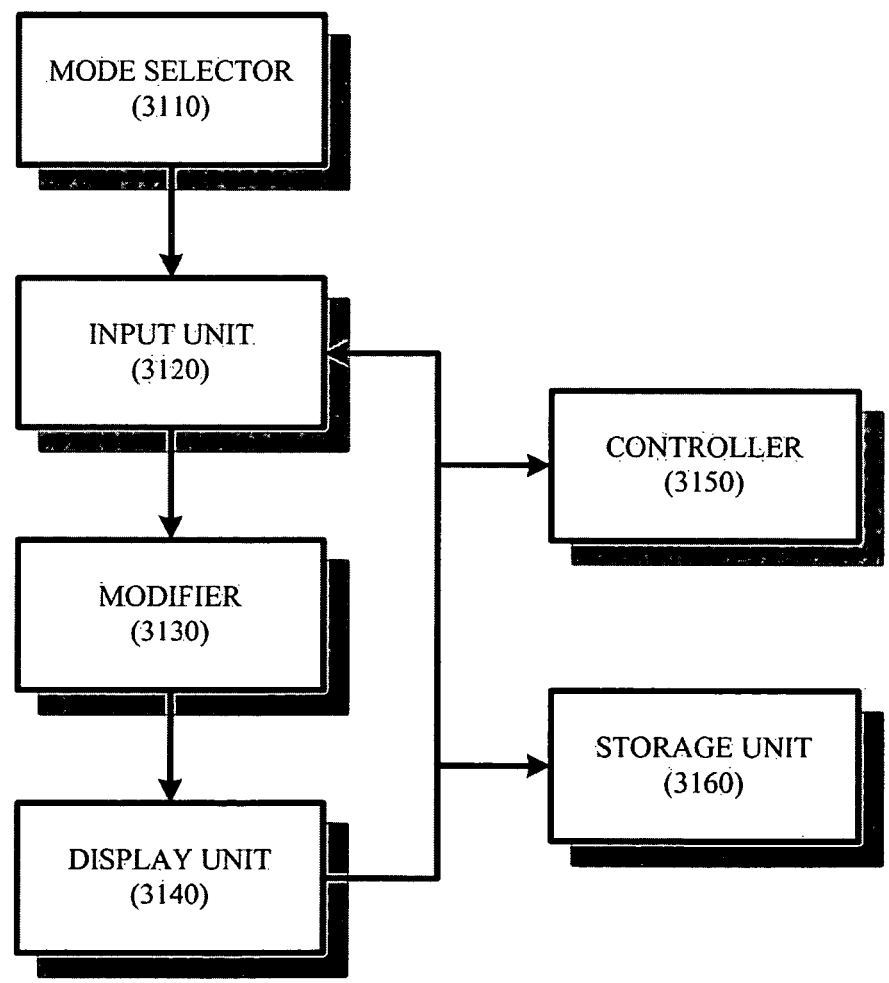
FIG. 31 is a block diagram of a digital device using an icon display method, according to an exemplary embodiment of the present invention.

FIG. 31 is a block diagram of an integrated digital device using an icon display method according to an exemplary embodiment of the present invention. The integrated digital device using the icon display method includes a mode selector 3110, an input unit 3120, a modifier 3130, a display unit 3140, a controller 3150, and a storage unit 3160.

The mode selector 3110 selects one mode from a plurality of modes in which different functions are performed. The mode selector 3110 may be implemented by a mode dial and allows a user to convert the integrated digital device to a preferred digital device.

The display unit 3140 displays icons indicating a plurality of setup information items on a screen corresponding to a shooting mode or a play mode of the integrated digital device and icons and characters indicating screen state information. The display unit 3140 may display the icons indicating the setup information items in a vertical direction along the right edge of the screen.

The input unit 3120 receives a first input command for deleting all icons and characters except the icons indicating the setup information items from the screen, a second input command for deleting even the icons indicating the setup information items remaining on the screen, and a third input command for displaying again on the screen the icons indicating the setup information items and the icons and characters indicating the screen state information. When the input unit 3120 receives the third input command, the display unit 3140 displays the icons indicating the setup information items and the icons and characters indicating the screen state information.

The modifier 3130 deletes all of the icons and characters except the icons indicating the setup information items from the screen in response to the first input command received by the input unit 3120 and deletes the icons indicating the setup information items remaining on the screen in response to the second input command received by the input unit 3120.

The first, second and third input commands are generated by one input key which is not implemented by hot keys (for example, 515 through 518 or 614 through 618) displayed on the right side on the screen. One input key is implemented by a physically fixed input key like a display key that is used as a fixed key and cannot be used as a hot key since it serves to turn on or off an on-screen display (OSD).

The controller 3150 controls the integrated digital device according to setup information set by the mode selector 3110 and input keys. Also, the controller 3150 generates icons indicating setup information corresponding to input keys and transmits the icons to the display unit 3140 so that the display unit 3140 displays the icons on the screen.

The storage unit 3150 stores the setup information and contents such as images, video, and audio to be displayed on the display unit 3140.

Figure 32:
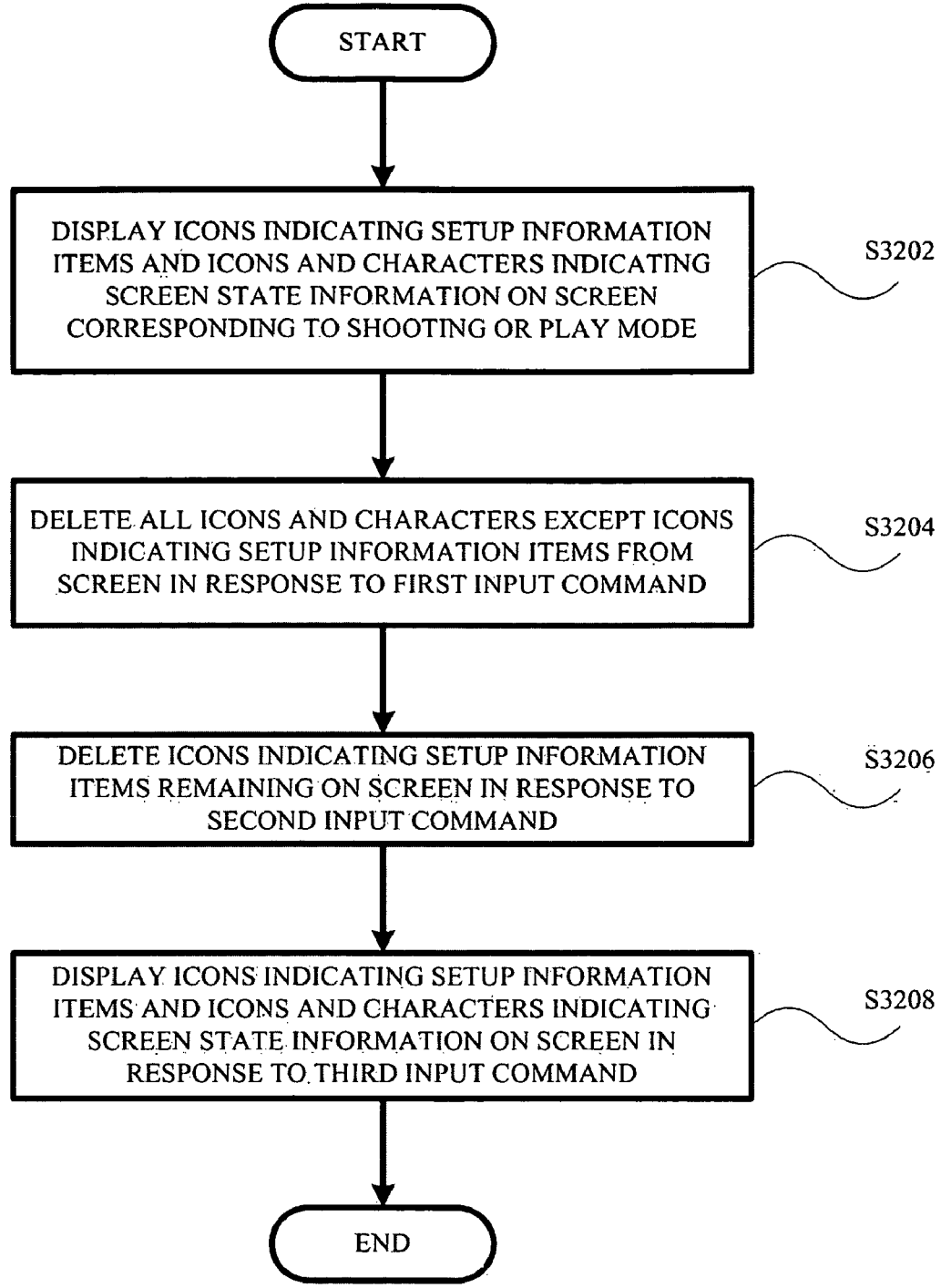
FIG. 32 is a flow chart of an icon display method according to an exemplary embodiment of the present invention.
Figure 33:
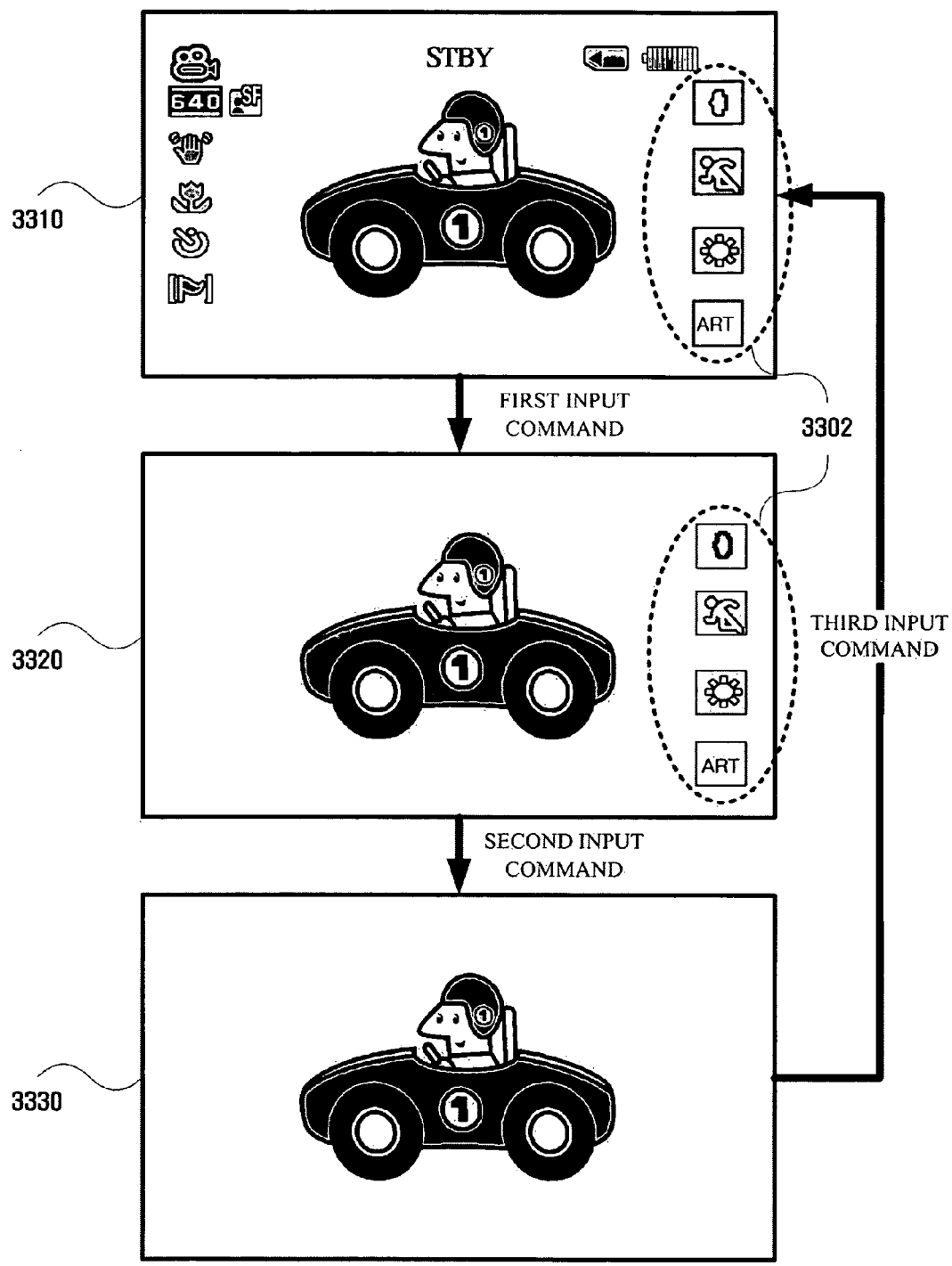
FIG. 33 illustrates screens in stages of the icon display method, according to an exemplary embodiment of the present invention.

A method of displaying icons according to an exemplary embodiment of the present invention will be described in time order with reference to FIG. 31, FIG. 32, and FIG. 33. FIG. 32 is a flow chart of an icon display method according to an exemplary embodiment of the present invention. FIG. 33 illustrates screens in stages of the icon display method, according to an exemplary embodiment of the present invention.

The display unit 3140 displays icons 3302 indicating a plurality of setup information items on a screen 3310 corresponding to a shooting mode or a play mode of the integrated digital device and icons and characters indicating screen state information in operation S3202. The screen 3310 of FIG. 33 shows a picture at the center which is an object. Icons indicating the screen state information are arranged on the left, and the icons 3302 indicating the setup information items on the right. Here, the icons 3302 indicating the setup information items are arranged in the vertical direction along the right edge of the screen 3310.

In operation S3204, the modifier 3130 deletes all icons and characters except the icons 3302 from a screen 3320 in response to the first input command input by a user. Since the icons 3302 corresponding to hot keys necessary for shooting or playing provide important information on essential functions to the user, it is preferable to leave the icons 3302 at the first stage rather than to delete all at one time.

In operation S3206, the modifier deletes the remaining icons 3302 from a screen 3330 in response to the second input command input by the user. In other words, all icons and characters except the object are deleted so that the user can see the clear screen 3330 showing the object.

When the user wants a state of the screen 3310 inputs the third input command, the display unit 3140 displays the icons 3302 and the icons and characters indicating screen state information in operation S3208. In other words, the screen 3330 is converted to the screen 3310 when the third input command is received.

As described above, the first, second and third input commands are input using one input key, which is implemented by a fixed key, such as, a display key in an exemplary embodiment of the present invention.

Figure 34:
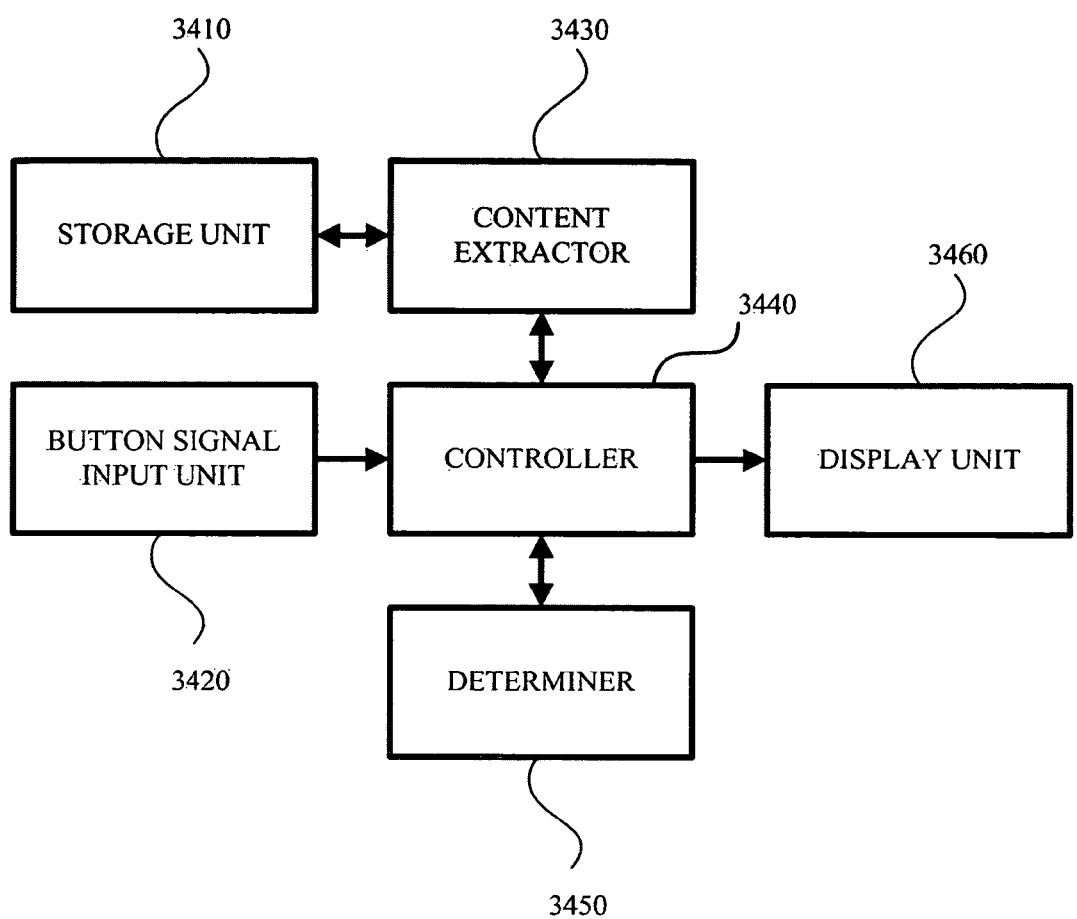
FIG. 34 is a block diagram of a device for displaying multimedia content, according to an exemplary embodiment of the present invention.

FIG. 34 is a block diagram of a device for displaying multimedia content, according to an exemplary embodiment of the present invention. The device includes a storage unit 3410, a button signal input unit 3420, a content extractor 3430, a controller 3440, a determiner 3450, and a display unit 3460.

The storage unit 3410 stores multimedia contents. The multimedia contents may include still images and moving images, such as, video.

In addition, the storage unit 3410 may include thumbnails corresponding to respective multimedia contents. Accordingly, the device may display the thumbnails as well as the multimedia contents.

For each multimedia content, information such as a file name, a created time, an access time, and a file size may be stored in the storage unit 3410. The information may be changed by a user. The multimedia contents may be stored in order based on the information or in a particular order set by the user. For example, the multimedia contents may be stored in order based on one type of information selected by the user from the file name, the created time, the access time, and the file size or may be stored in a particular order set by the user.

The order in which the multimedia contents are stored is the order in which the multimedia contents are displayed. The device extracts and displays the thumbnails corresponding to the multimedia contents in the stored order.

A user can prevent a certain multimedia content from being searched by inserting information indicating no search into information on the multimedia content. For example, when multimedia contents aaa, bbb, ccc, ddd, and eee are stored in the storage unit 3410 and the multimedia contents bbb and ccc are set to "no search", the device searches the multimedia contents aaa, ddd, and eee excluding the multimedia contents bbb and ccc and extracts and displays the thumbnails corresponding to the multimedia contents aaa, ddd, and eee.

The button signal input unit 3420 receives a button signal. The button signal input unit 3420 may receive a button signal via a wired or wireless connection.

When a button is provided in the device, a button signal is generated when the button is pressed and is transmitted to the button signal input unit 3420. When a button is not provided in the device, a button signal may be generated by a separate button connected to the device via a cable and transmitted to the button signal input unit 3420 via the cable.

Alternatively, a button signal may be generated by a wireless unit such as a remote control and transmitted to the button signal input unit 3420 via propagation according to a predetermined wireless protocol.

For example, a button and the button signal input unit 3420 may communicate with each other using a wired communication method such as Ethernet, USB, IEEE 1394, serial communication, or parallel communication or a wireless communication method such as infrared radiation, Bluetooth, home radio frequency (RF), or wireless local area network (WLAN).

Here, the button signal may include information (for example, a code indicating an arrow button) for performing a motion to search the stored multimedia contents and may also include information indicating a time when the button is initially selected so that the device can recognize the continuance of the button signal of the pressed button.

When a button is pressed by a user, a corresponding button signal is generated and transmitted to the button signal input unit 3420, and when the button is released by the user, the button signal stops and the transmission of the button signal to the button signal input unit 3420 also stops. When the button is continuously pressed, the button signal may be generated at predetermined intervals. In this case, the device may recognize the operation as if the button is repeatedly pressed and released by the user.

Accordingly, when information on a time when a button is initially pressed by a user is inserted into a button signal generated when the button is pressed, the device can determine whether a button signal currently received has been continued or newly generated. Instead of the time information, a special code may be inserted into the button signal. A different code is generated according to a predetermined algorithm and is inserted to a button signal each time a button is pressed by a user. For example, when a user presses a button again after pressing and releasing the button once, a different code is inserted into a button signal. Accordingly, the device can determined that the button signal is not continuous even though it is generated from the same button.

Also, a unique selection code and a unique release code may be set for a button so that the device can detect a duration while the button is continuously pressed. For example, when a selection code of 0x01 and a release code of 0x02 are allocated to a right arrow button, the device can determined that the right arrow button has been continuously pressed after the code. 0x01 is received until the code 0x02 is received.

When a switch type button is connected to the button signal input unit 3420 via a cable, current may or may not flow according to a user's selection of the button. In this situation, the device can detect a duration while the user selects the button based on a period of time while current flows continuously since it started flowing.

The button signal is transmitted to the controller 3440. The controller 3440 confirms that an input signal is the button signal and transmits it to the determiner 3450.

The determiner 3450 determines the continuance of a button signal. In detail, the determiner 3450 determines whether a button is continuously selected without being released, based on time information, a code generated according to a predetermined algorithm, selection and release codes allocated to the button, or start and end times of a current flow generated by the button of a switch type.

For example, when time information is inserted into a button signal, a value of 13:59:58 (hour/minute/second) may be inserted into the button signal as the time information. The button signal may be repeated input to the device at predetermined intervals. Upon receiving the button signal, the determiner 3450 identifies what button has generated the received button signal and checks the time information. Since the same time information is inserted into the same button signal, the determiner 3450 can determine that the button has been continuously selected while the button signal continuously includes the value of 13:59:58.

In addition, when a different code is generated according to a predetermined algorithm and inserted into a button signal whenever a corresponding button is newly pressed, the determiner 3450 can determine whether the button is continuously selected by comparing a previously received code with a currently received code. Since a code allocated to the button when the button is selected on one occasion is different from a code allocated to the button when the button is selected on another occasion after being released, the determiner 3450 can determine whether button signals repeatedly input corresponding to the button at predetermined intervals are generated from the button that has been continuously selected.

Also, when current flows in response to the selection of a switch type button, the determiner 3450 can determine whether a button signal is generated by the button selected continuously based on whether current flows continuously.

The determiner 3450 can detect a duration while a button is continuously selected starting from an initial selection of the button. Here, continuance may be divided into a plurality of levels according to the duration. For example, a duration of 3 seconds may be defined as a first level; a duration of 5 second may be defined as a second level; and a duration of 7 seconds may be defined as a third level. Accordingly, a timer (not shown) reporting a time flow may be provided for the device. The determiner 3450 can detect a duration since a button is selected using the timer.

A duration or a continuance level corresponding to the duration, which is detected by the determiner 3450, is transmitted to the controller 3440, which transmits it to the content extractor 3430.

The content extractor 3430 extracts different numbers of multimedia contents from the storage unit 3410 according to the duration or the continuance level corresponding to the duration. For example, when the duration is less than 3 seconds or the continuance level is the first level, the content extractor 3430 may extract a thumbnail corresponding to single multimedia content at one time. When the duration is at least 3 seconds and less than 5 seconds or the continuance level is the second level, the content extractor 3430 may extract four thumbnails respectively corresponding to four multimedia contents at one time. When the duration is at least 5 seconds and less than 7 seconds or the continuance level is the third level, the content extractor 3430 may extract nine thumbnails respectively corresponding to nine multimedia contents at one time.

Here, the content extractor 3430 may extract multimedia content thumbnails according to the order in which the multimedia contents are stored in the storage unit 3410.

Meanwhile, the content extractor 3430 may extract multimedia content thumbnails at different intervals according to the duration received from the controller 3440. For example, in a state in which the multimedia content thumbnails are extracted one by one, when the duration is less than 3 seconds or the continuance level is the first level, the content extractor 3430 may repeatedly extract a multimedia content thumbnail stored next to a current one. When the duration is at least 3 seconds and less than 5 seconds or the continuance level is the second level, the content extractor 3430 may repeatedly extract a multimedia content thumbnail stored at the 10th place from a current one. When the duration is at least 5 seconds and less than 7 seconds or the continuance level is the third level, the content extractor 3430 may repeatedly extract a multimedia content thumbnail stored at the 100th place from a current one.

The extracted multimedia content thumbnails are transmitted to the display unit 3460 via the controller 3440.

The display unit 3460 is a module including an image display unit, such as a cathode-ray tube (CRT), an LCD, a light-emitting diode (LED), an organic LED (OLED), or a plasma display panel (PDP), and displays a multimedia content received from the controller 3440. The display unit 3460 may be included in the device or may be implemented by a separate module which receives multimedia content thumbnails via a wired or wireless connection and displays the thumbnails.

Figure 35:
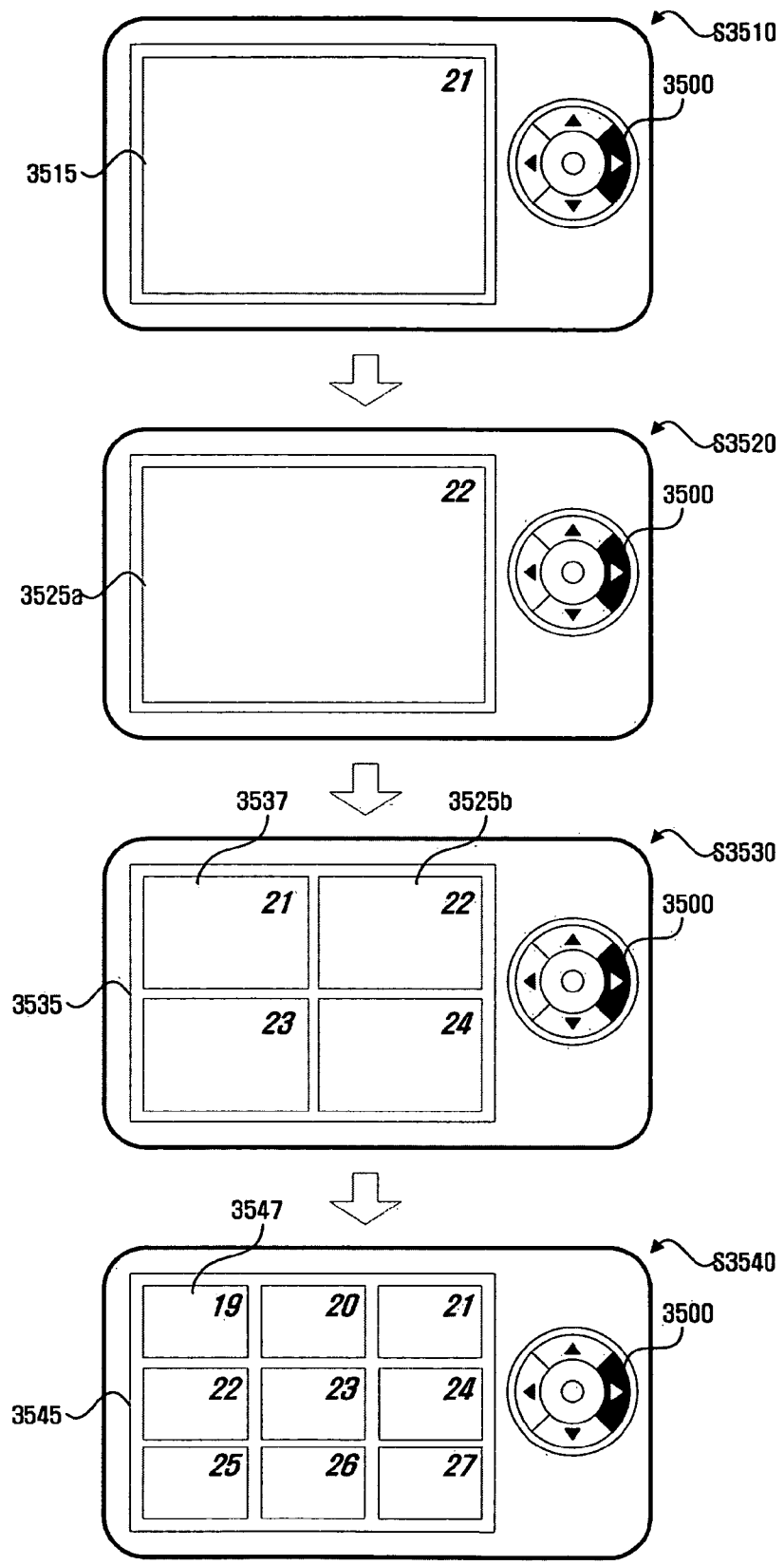
FIG. 35 illustrates a procedure of displaying thumbnails corresponding to multimedia contents, according to an exemplary embodiment of the present invention.

FIG. 35 illustrates a procedure of displaying multimedia content thumbnails, according to an exemplary embodiment of the present invention. In stage S3510, a single multimedia content thumbnail 3515 selected by a user is displayed on the display unit 3460.

Here, the user can search multimedia content thumbnails stored in the storage unit 3410 using arrow buttons. For example, when a left arrow button is selected, a multimedia content thumbnail previously stored to the current multimedia content thumbnail 3515 is displayed. When a right arrow button 3500 is selected, a multimedia content thumbnail 3525*a* stored next to the current multimedia content thumbnail 3515 is displayed in stage S3520.

In stage S3520, the multimedia content thumbnail 3525*a* is sequentially displayed on the display unit 3460 according to the order in which the multimedia content thumbnails are stored in the storage unit 3410 when the right arrow button 3500 is continuously selected without being released from stage S3510. While the right arrow button 3500 is continuously selected from stage S3510 exceeds a predetermined threshold, the display unit 3460 divides a screen into four sections and displays four multimedia content thumbnails on one screen 3535 in stage S3530.

When the duration of the continuous selection of the right arrow button 3500 exceeds another predetermined threshold, the display unit 3460 divides a screen into 9 sections and displays 9 multimedia content thumbnails on one screen 3545 in stage S3540.

The 4 multimedia content thumbnails displayed on the screen 3535 may include the multimedia content thumbnail 3525*b* displayed immediately before the divided screen 3535. In this case, multimedia content thumbnails may be displayed considering the number of multimedia content thumbnails to be displayed at one time and the order in which the multimedia content thumbnails are stored in the storage unit 3410.

For example, when a previous multimedia content thumbnail 3525*a* has been stored at the 22nd place in the storage unit 3410 and the current screen 3535 is divided into four sections to display the four multimedia content thumbnails, the display unit 3460 may display a multimedia content thumbnail 3537, which has been stored at a place corresponding to a value obtained by adding 1 to a multiple of 4, such as, a 21st (=4×5+1) place, at a first section positioned in an upper left of the screen 3535.

Similarly, when a previous multimedia content thumbnail 3525*b* has been stored at the 22nd place in the storage unit 3410 and the current screen 3545 is divided into 9 sections, the display unit 3460 may display a multimedia content thumbnail 3547, which has been stored at a place corresponding to a value obtained by adding 1 to a multiple of 9, such as, a 19th (=9×2+1) place, at a first section positioned in an upper left of the screen 3545.

The number of sections into which a screen is divided by the display unit 3460 may be different according to the image playback performance of the display unit 3460 and may be limited by a user. For example, the user can limit the number of sections in a screen to 9 or 16.

Figure 36:
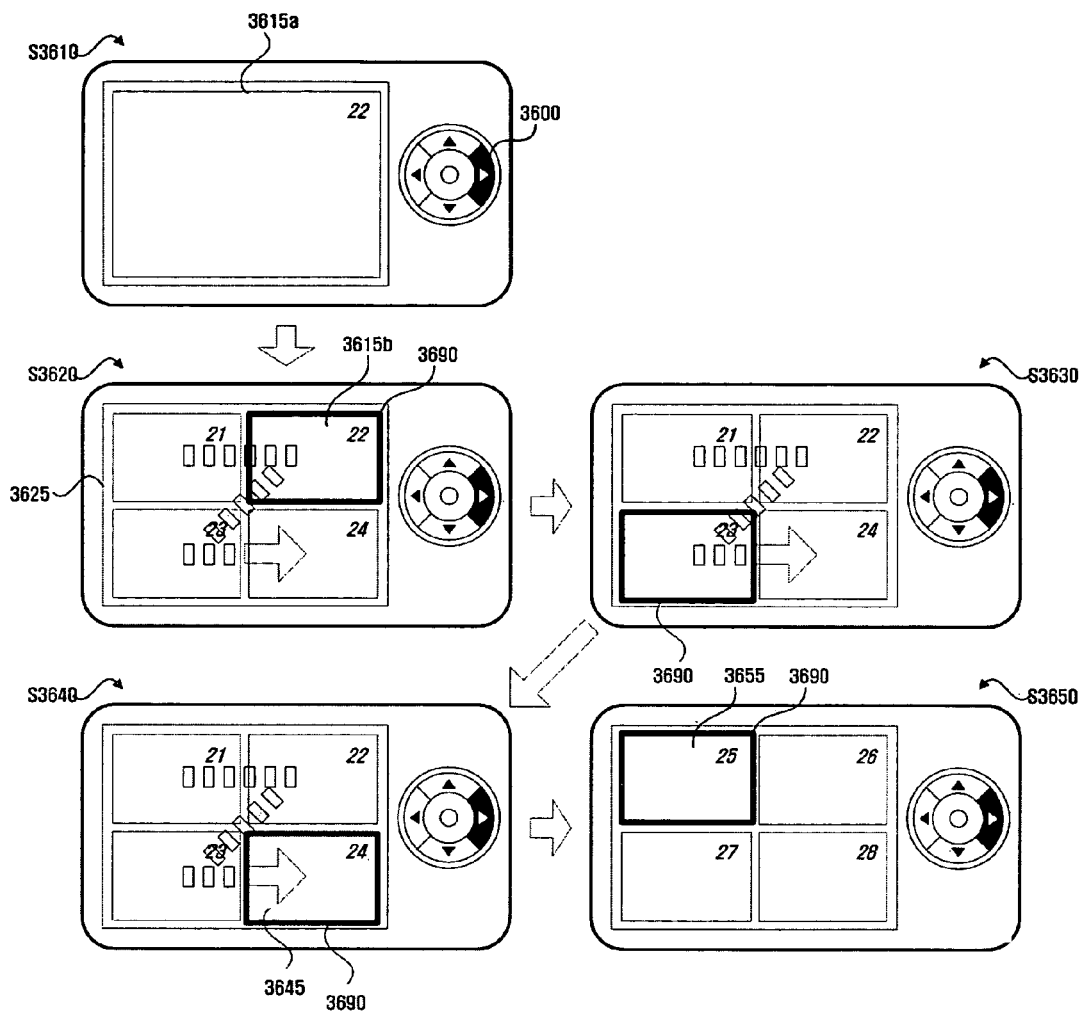
FIG. 36 illustrates the shift of a cursor selecting a thumbnail corresponding to a multimedia content, according to an exemplary embodiment of the present invention.

FIG. 36 illustrates the shift of a cursor 3690 selecting one thumbnail among a plurality of multimedia content thumbnails S3620, S3630, S3640, S3650 displayed on one screen by the display unit 3460, according to an exemplary embodiment of the present invention.

When a right arrow button 3600 is continuously selected without being released in a state in which a single multimedia content thumbnail is displayed, a multimedia content thumbnail 3615a stored next to the previous multimedia content thumbnail is displayed in stage S3610.

Thereafter, when a duration of continuously selecting the right arrow button 3600 exceeds a predetermined threshold in stage S3610, the display unit 3460 divides a screen 3625 into four sections and displays four multimedia content thumbnails in stage S3620.

Here, one thumbnail 3615b corresponding to the multimedia content thumbnail 3615a displayed immediately before the screen division can be selected among the four multimedia content thumbnails using the cursor 3690.

When the right arrow button 3600 has been continuously selected, the cursor 3690 is continuously shifted in stages S3630 and S3640 according to the order in which the multimedia content thumbnails are stored. When the right arrow button 3600 has been continuously selected in a state in which a last multimedia content thumbnail 3645 positioned on a lower right side is selected by the cursor 3690, four other multimedia content thumbnails including a multimedia content thumbnail 3655 stored next to the last multimedia content thumbnail 3645 are displayed in stage S3650.

The shift of the cursor 3690 and screen transition proceed according to the continuous selection of one arrow button. When the selection of the arrow button is released, the shift of the cursor 3690 and the screen transition stop.

After the stop, the display unit 3460 may continuously display a screen with divided sections or may display a multimedia content thumbnail selected by the cursor 3690 immediately before the shift of the cursor 3690 stops.

Figure 37:
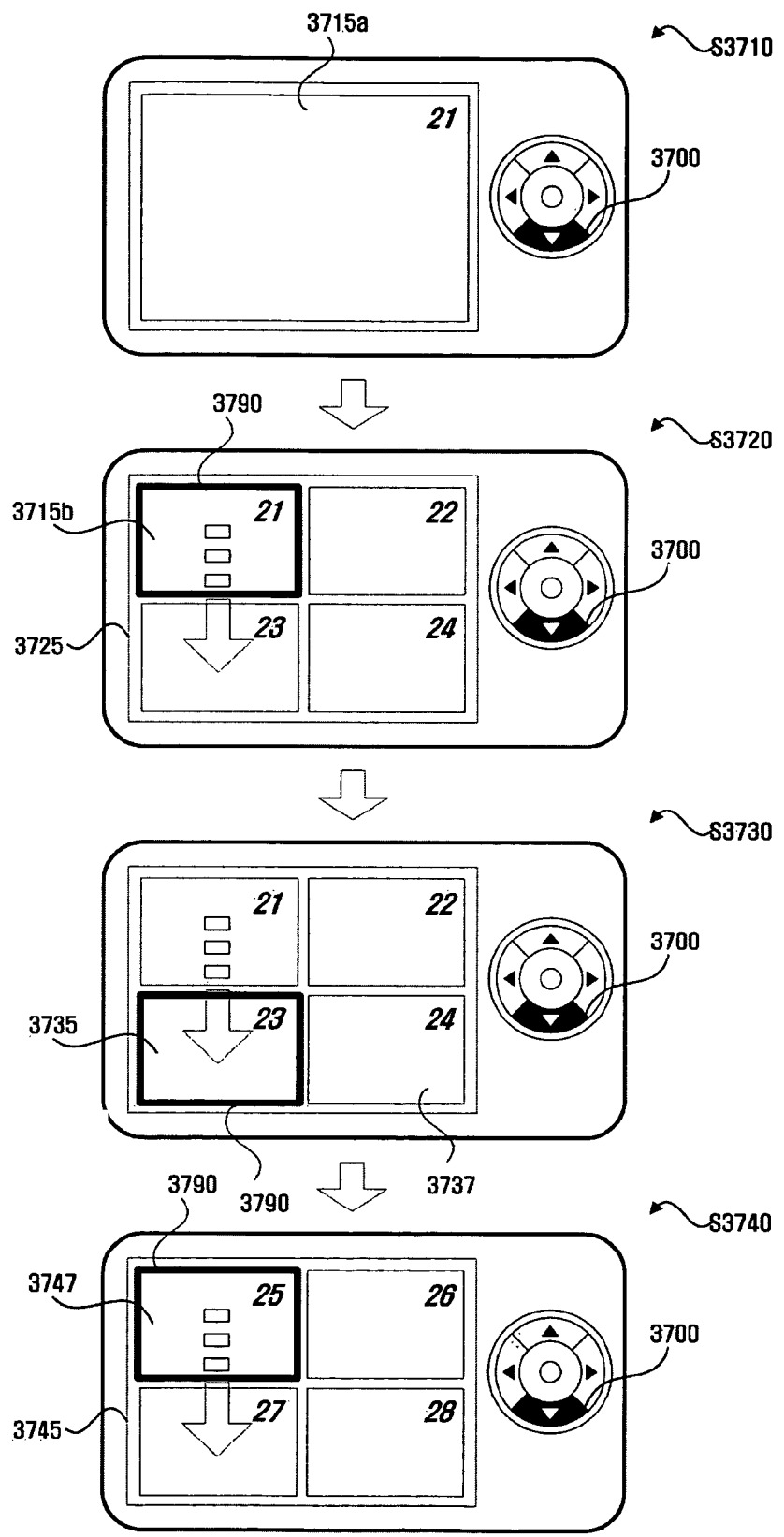
FIG. 37 illustrates the shift of a cursor selecting a thumbnail corresponding to a multimedia content, according to another exemplary embodiment of the present invention.

FIG. 37 illustrates the shift of a cursor 3790 selecting one thumbnail among a plurality of multimedia content thumbnails displayed on one screen by the display unit 3460, according to another exemplary embodiment of the present invention.

When a down arrow button 3700 is continuously selected without being released in a state in which a single multimedia content thumbnail is displayed, a multimedia content thumbnail 3715a stored next to the previous multimedia content thumbnail is displayed in stage S3710.

Thereafter, when a duration of the continuous selection of the down arrow button 3700 exceeds a predetermined threshold in stage S3710, the display unit 3460 divides a screen 3725 into four sections and displays four multimedia content thumbnails in stage S3720.

Here, one thumbnail 3715b corresponding to the multimedia content thumbnail 3715a displayed immediately before the screen division can be selected from the four multimedia content thumbnails using the cursor 3790.

When the down arrow button 3700 has been continuously selected, the cursor 3790 is shifted down in stage S3730. In other words, as illustrated in FIG. 37, the cursor 3790 is shifted from a position of the 21st multimedia content thumbnail 3715b to a position of a 23rd multimedia content thumbnail 3735.

When the down arrow button 3700 has been continuously selected in a state in which the 23rd multimedia content thumbnail 3735 at the bottom of the screen is selected by the cursor 2790, the display unit 3460 displays next four multimedia content thumbnails on a screen 3745 in stage S3740. In other words, the four multimedia content thumbnails including a multimedia content thumbnail 3747 stored next to a last multimedia content thumbnail 3737 displayed on the lower right side on stage S3730 are displayed.

The shift of the cursor 3790 and screen transition proceed according to the continuous selection of one arrow button. When the selection of the arrow button is released, the shift of the cursor 3790 and the screen transition stop.

After the stop, the display unit 3460 may continuously display a screen with divided sections or may display a multimedia content thumbnail selected by the cursor 3790 immediately before the shift of the cursor 3790 stops.

Figure 38:
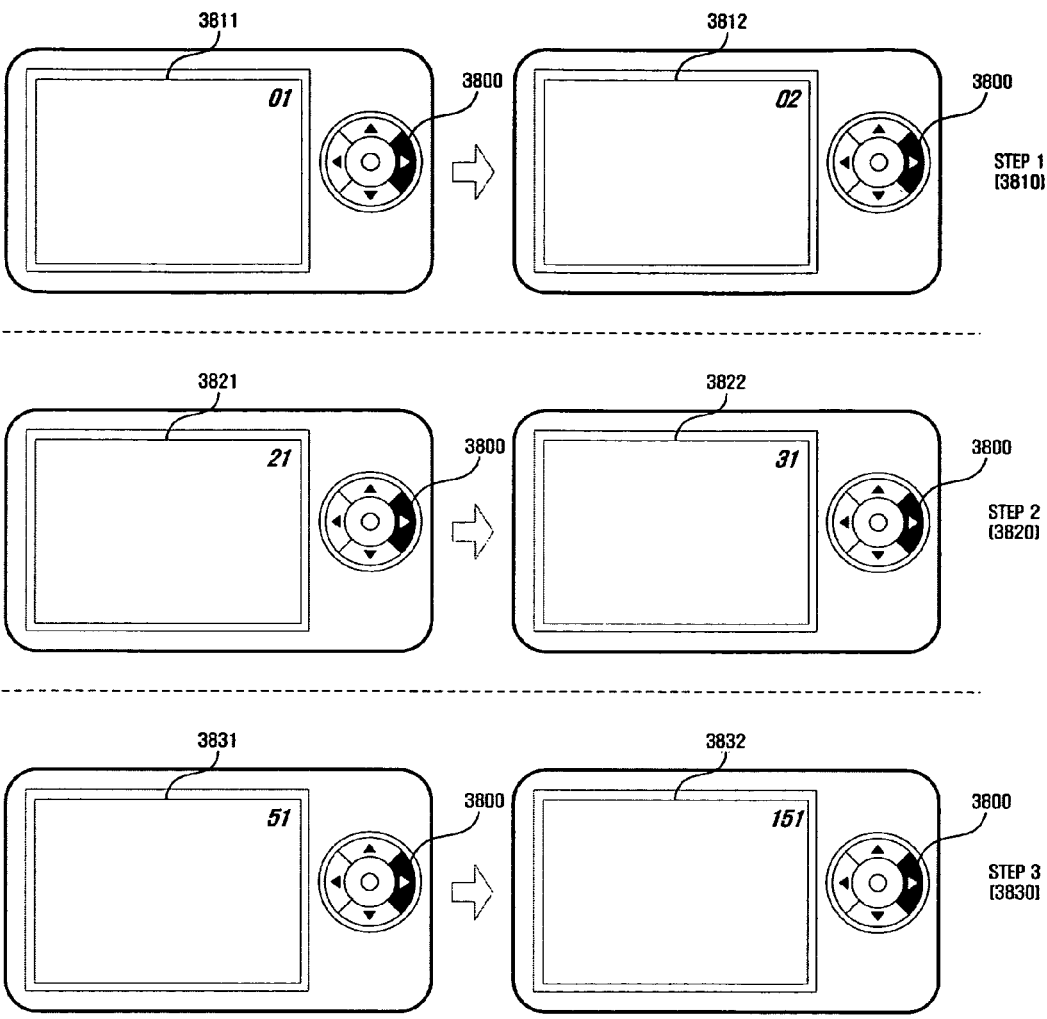
FIG. 38 illustrates a procedure of displaying thumbnails corresponding to multimedia contents, according to another exemplary embodiment of the present invention.

FIG. 38 illustrates a procedure of displaying multimedia content thumbnails according to a level of a duration while a button 3800 is continuously selected when a single multimedia content thumbnail is displayed on a screen at one time, according to an exemplary embodiment of the present invention.

The level may be set by a user. In the current exemplary embodiment of the present invention, a first level 3810 is assumed to be defined when the duration is less than 3 seconds; a second level 3820 is assumed to be defined when the duration is at least 3 seconds and less than 5 seconds; and a third level 3830 is assumed to be defined when the duration is at least 5 seconds and less than 7 seconds.

In response to the first level 3810, the display unit 3460 displays multimedia content thumbnails in the order in which they are stored in the storage unit 3410. For example, the display unit 3460 displays a first multimedia content thumbnail 3811 and then displays a second multimedia content thumbnail 3812. This sequential display may be continued until a user stops the display or changes the first level 3810 to the second level 3820.

In the second level 3820, the display unit 3460 displays multimedia content thumbnails according to the stored order at intervals of 10. For example, the display unit 3460 displays a 21st multimedia content thumbnail 3821 and then displays a 31st multimedia content thumbnail 3822. This interval display may be continued until the user stops the display or changes the second level 3820 to the third level 3830.

In the third level 3830, the display unit 3460 displays multimedia content thumbnails according to the stored order at intervals of 100. For example, the display unit 3460 displays a 51st multimedia content thumbnail 3831 and then displays a 151st multimedia content thumbnail 3832. This interval display may be continued until a user stops the display or changes the third level 3830 to a next level.

The levels of the duration and the display intervals may be determined by the user.

In the current exemplary embodiment of the present invention illustrated in FIG. 38, a single multimedia content thumbnail is displayed on a screen at one time, but a plurality of multimedia content thumbnails, for example, four or nine multimedia content thumbnails, may be displayed on one screen.

Figure 39:
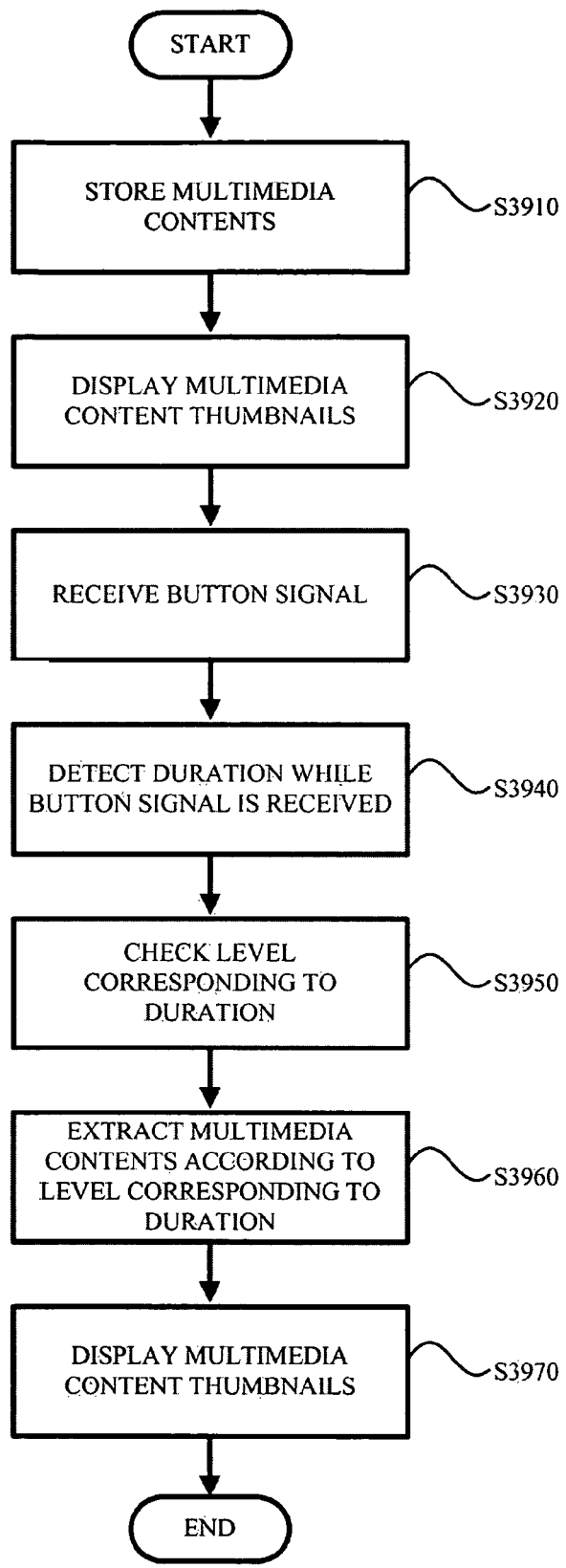
FIG. 39 is a flowchart of a method of displaying multimedia contents according to an exemplary embodiment of the present invention.

FIG. 39 is a flowchart of a method of displaying multimedia contents according to an exemplary embodiment of the present invention.

In operation S3910, multimedia contents are stored in the storage unit 3410. The storage unit 3410 may be included in a device or may be implemented by a separated module, which transmits multimedia contents or multimedia content thumbnails to the device by way of wired or wireless communication.

The multimedia contents stored in the storage unit 3410 may have been generated by the device of may have been received from a different device. Here, the device may include units (for example, an image pickup unit, a decoder, and an image signal processor) for generating multimedia contents.

The multimedia contents may be stored in the storage unit 3410 in a predetermined order. In detail, the multimedia contents may be stored in order of file name, creation time, access time, or file size, which is selected by a user, or an order specially defined by the user.

In operation S3920, one of the multimedia contents is displayed in response to the user's command. Here, a multimedia content or a multimedia content thumbnail may be displayed. Hereinafter, it is assumed that multimedia content thumbnails are stored in the storage unit 3410 and the multimedia content thumbnails are displayed. However, the size of multimedia contents may be converted and then directly displayed.

In operation S3930, a button signal is received when the user selects a left or right arrow button to display a previous or next multimedia content thumbnail in a state where a single multimedia content thumbnail is displayed.

The buttons may be provided in the device or may be implemented in a separate module which transmits a button signal to the device by way of wired or wireless communication. The button signal may include a code indicating a type of a corresponding button and information on a time when the button is selected, a code generated according to a predetermined algorithm, or a selection code and a release code set for the button.

The received button signal is transmitted to the controller 3440. The controller 3440 confirms whether the input signal is the button signal and transmits the button signal to the determiner 3450. In operation S3940, the determiner 3450 detects a duration while the button signal is received.

The determiner 3450 may use the information on a time when the button is selected, the code generated according to a predetermined algorithm, or the selection code and the release code set for the button to detect the duration.

For example, when a value of 13:59:58 is included in the button signal as the time information, the determiner 3450 detects a duration based on the time.

When the code generated according to the predetermined algorithm is included in the button signal, the determiner 3450 detects as the duration a period of time from the reception of a button signal including one code to the reception of a button signal including a different code.

When the selection code and the release code are included in the button signals, the determiner 3450 detects as the duration a period of time from the reception of a button signal including the selection code and the reception of a button signal including the release code.

The duration detected by the determiner 3450 is transmitted to the controller 3440. In operation S 3950, the controller 3440 checks a level of the duration and transmits the duration or the level of the duration to the content extractor 3430.

For example, a duration of less than 3 seconds may be defined as a first level; a duration of at least 3 seconds and less than 5 second may be defined as a second level; and a duration of at least 5 seconds and less than 7 seconds may be defined as a third level. The controller 3440 may transmit the duration or a level determined based on the above-described matching to the content extractor 3430.

In operation S3960, the content extractor 3430 extracts multimedia content thumbnails in different numbers from the storage unit 3410 according to the duration or the level of the duration.

For example, the content extractor 3430 extracts multimedia content thumbnails one by one at predetermined intervals in response to the first level, four by four at predetermined intervals in response to the second level, and nine by nine at predetermined intervals in response to the third level.

Here, the content extractor 3430 may extract multimedia contents or thumbnails corresponding to the respective multimedia contents from the storage unit 3410. The number of multimedia content thumbnails displayed at one time according to the level of the duration may be set by the user. In operation S3970, the display unit 3460 receives and displays the extracted multimedia content thumbnails.

According to an exemplary embodiment of the present invention, a plurality of function modes are set using several input keys and different types of information are set using one input key, so that many functions can be controlled with a small number of buttons.

Also, a state of an MP3 player mode can be adjusted using several input keys and state information of the MP3 player mode is displayed on a display according to the change in a state of the MP3 player mode, so that a user can easily use MP3 player functions in an integrated digital device.

A state of a DMB receiver mode can be adjusted using several input keys and state information of the DMB receiver mode is displayed on a display according to the change in a state of the DMB receiver mode, so that the user can easily use DMB receiver functions in the integrated digital device.

A plurality of function modes and various main and sub menus of a digital device having various functions are efficiently displayed using a menu display method, thereby providing convenient GUI for users.

The user is allowed to select a screen, from which all icons and characters except hot key information indicating essential functions are removed, or a screen, from which all icons and characters are totally removed, using a step-by-step key input command in a digital camera or a digital camcorder, thereby providing convenience for the user.

Moreover, the number of thumbnails is changed according to the duration while selection of a multimedia content search button is continued, so that a large number of multimedia contents can be searched quickly. Also, a search interval is also changed according to the duration, so that a large number of multimedia contents can be searched quickly even when the number of multimedia contents displayed at one time is not changed.

While the present invention has been shown and described with reference to certain exemplary embodiments thereof, it will be understood by those of ordinary skill in the art that various changes in form and details may be made therein without departing from the spirit and scope of the present invention as defined by the appended claims and their equivalents.

What is claimed is:

1. A digital image capturing device comprising:
   an image capturing unit;
   a flash which provides light;
   a display unit which displays at least one still or moving image captured by the image capturing unit or a plurality of menu or sub-menu items;
   an input unit which allows a user to interact with the plurality of menu or sub-menu items displayed on the display unit;
   a digital audio playback unit which controls the device so that at least one digital audio file can be played;
   a storage unit which stores the at least one still or moving image captured by the image capturing unit and the at least one digital audio file playable by the digital audio playback unit;
   a digital television (TV) broadcast signal receiver which receives a digital TV broadcast signal;
   a connection interface unit which provides a connection between the device and an external device;

a controller which controls a plurality of operation modes, wherein the plurality of operation modes comprise a digital camera mode, a digital camcorder mode, a digital audio playback mode, a digital TV playback mode, and a digital still or moving image display mode; and a mode selector configured to select a mode from the plurality of operation modes, wherein at least one subset of the plurality of menu or sub-menu items is respectively assigned to at least one operation mode, and wherein a plurality of corresponding menu or sub-menu items of the at least one subset are displayed according to an operation mode selected by the user using the mode selector, wherein a plurality of menu items corresponding to the selected operation mode are displayed in a first menu area and a plurality of sub-menu items corresponding to a respective menu item are displayed in a second menu area.

2. The digital image capturing device of claim 1, further comprising:

wherein, when the digital TV playback mode is selected, a corresponding menu or sub-menu item comprising at least one channel list and favorite channel setup information can be displayed.

3. The digital image capturing device of claim 1, wherein, when the digital camera mode is selected by the user, a corresponding menu or sub-menu item comprising a flash item, a close-up shooting item, a self-timer item, a slideshow item, and an erase protection item can be displayed on the display unit.

4. The digital image capturing device of claim 1, wherein, when the digital camcorder mode is selected by the user, a corresponding menu or sub-menu item comprising an automatic exposure item, a white balance item, a color tone item, an erase protection item, and a video playback option item can be displayed on the display unit.

5. The digital image capturing device of claim 1, wherein, when the digital audio playback mode is selected by the user, a corresponding menu or sub-menu comprising a user playlist display item, a repeated playback item, an equalizer item, and a stored content list display item can be displayed on the display unit.

6. The digital image capturing device of claim 1, further comprising:

a digital audio recorder unit, wherein the plurality of operation modes further comprises an audio recorder mode, and wherein, when the audio recorder mode is selected, a corresponding menu or sub-menu item comprising a repeated playback item, an erase protection item, and a stored content list display item can be displayed.

7. The digital image capturing device of claim 1, wherein the display unit displays a menu or sub-menu item as an icon indicating content of the corresponding menu or sub-menu item.

8. The digital image capturing device of claim 7, wherein an icon of each of the plurality of menu or sub-menu items can be varied when the content of the corresponding menu or sub-menu item is changed.

9. The digital image capturing device of claim 1, wherein, when an input from the input unit is received, a sub menu for the menu item which is controlled by the input can be displayed.

10. . The digital image capturing device of claim 1, wherein the connection interface unit allows the device to be connected to the external device by using a wired communication method including Ethernet, universal serial bus (USB), IEEE 1394, serial communication, parallel communication, or a wireless communication method including infrared radiation, Bluetooth, home radio frequency (RF), or wireless local area network (WLAN).

11. The digital image capturing device of claim 10, further comprising a USB port to be connected to a computer to function as a USB storage.

12. The digital image capturing device of claim 1, wherein the digital audio file comprises a MPEG layer 3 (MP3) file.

13. The digital image capturing device of claim 1, wherein, while information corresponding to one of the plurality of menu or sub-menu items is set, the display unit makes an icon corresponding to the one of the plurality of menu or sub-menu items blink.

14. The digital image capturing device of claim 1, wherein the plurality of menu or sub-menu items comprise at least one of a flash item, a close-up shooting item, a self-timer item, a slideshow item, an erase protection item, a channel list display item, a favorite channel item, a stored content list display item, a user playlist display item, a repeated playback item, an equalizer item, an automatic exposure item, a white balance item, a color tone item, and a video playback option item.

15. A digital device comprising:

an image capturing unit;

a flash which provides light;

a display unit which displays at least one still or moving image captured by the image capturing unit or a plurality of menu or sub-menu items;

an input unit which allows a user to interact with the plurality of menu or sub-menu items displayed on the display unit;

a digital audio playback unit which controls the device so that at least one digital audio file can be played;

a storage unit which stores the at least one still or moving image captured by the image capturing unit or displayable on the display unit and the at least one digital audio file playable by the digital audio playback unit;

a digital television (TV) broadcast signal receiver which receives a digital TV broadcast signal;

a connection interface unit which provides a connection between the device and an external device, the connection interface unit comprising a universal serial bus (USB) port; and a controller which controls a plurality of operation modes, wherein the plurality of operation modes comprise a digital camera mode, a digital camcorder mode, a digital audio playback mode, a digital TV playback mode and a digital still or moving image display mode;

a mode selector configured to select a mode from the plurality of operation modes, wherein at least one subset of the plurality of menu or sub-menu items is respectively assigned to at least one operation mode, and wherein a plurality of corresponding menu or sub-menu items of the at least one subset are displayed according to an operation mode selected by the user using the mode selector, wherein a plurality of menu items corresponding to the selected operation mode are displayed in a first menu area and a plurality of sub-menu items corresponding to a respective menu item are displayed in a second menu area.

16. The device of claim 15, further comprising an antenna for the digital TV broadcast signal receiver.

* * * * *